(12) United States Patent
Tomofuji et al.

(10) Patent No.: US 7,343,102 B2
(45) Date of Patent: Mar. 11, 2008

(54) OPTICAL TRANSMISSION SYSTEM WITH AUTOMATIC SIGNAL LEVEL ADJUSTMENT AND STARTUP FUNCTIONS

(75) Inventors: Hiroaki Tomofuji, Kawasaki (JP); Takuji Maeda, Kawasaki (JP); Taizo Maeda, Kawasaki (JP); Hideki Kobayashi, Yokohama (JP); Tatsuo Nagayoshi, Yokohama (JP); Tetsuo Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 10/898,541

(22) Filed: Jul. 26, 2004

(65) Prior Publication Data

US 2005/0158057 A1 Jul. 21, 2005

(30) Foreign Application Priority Data

Jan. 15, 2004 (JP) .............................. 2004-007857

(51) Int. Cl.
*H04B 10/00* (2006.01)
(52) U.S. Cl. ...................................... 398/160; 398/140
(58) Field of Classification Search ................ 398/140, 398/158, 160, 173, 181, 177
See application file for complete search history.

(56) References Cited

U.S. PATENT DOCUMENTS

| 5,436,603 | A | * | 7/1995 | Fischer ....................... 333/243 |
| 5,570,438 | A | * | 10/1996 | Fontana et al. ................ 385/24 |
| 5,943,146 | A | * | 8/1999 | Harano ......................... 398/31 |
| 6,275,313 | B1 | * | 8/2001 | Denkin et al. .................. 398/9 |
| 6,288,836 | B1 | * | 9/2001 | Kawasaki et al. ...... 359/341.42 |
| 2003/0035171 | A1 | * | 2/2003 | Touma ........................ 359/124 |
| 2003/0231888 | A1 | * | 12/2003 | Takashina et al. .......... 398/149 |

OTHER PUBLICATIONS

Japanese Abstract Pub. No. 2003-174421 dated Jun. 20, 2003.
Japanese Abstract Pub. No. 11-074371 dated Mar. 16, 1999.
Japanese Abstract Pub. No. 2004-023437 dated Jan. 22, 2004.
Patent Abstracts of Japan, Pub. No. 2003-163641, published Jun. 6, 2003.

* cited by examiner

*Primary Examiner*—Jason Chan
*Assistant Examiner*—Quan-Zhen Wang
(74) *Attorney, Agent, or Firm*—Staas & Halsey LLP

(57) ABSTRACT

An optical transmission system with automatic startup functions to optimize the power level of optical signals entering each optical amplifier and operate those amplifiers in appropriate mode. In the process of starting up an optical transmission system, upstream and downstream optical transmission devices set up themselves under the coordination of their internal controllers. The downstream device controller adjusts its local variable optical attenuator by utilizing optical noise emission from a post-amplifier in the upstream optical transmission device, and it selects and sets a preamplifier unit to work in appropriate operating mode. The upstream device controller, on the other hand, selects and sets operating mode of its local post-amplifier unit. During this process, the upstream and downstream device controllers exchange messages over supervisory control channels to achieve the purpose.

22 Claims, 20 Drawing Sheets

OPTICAL TRANSMISSION SYSTEM WITH AUTOMATIC SIGNAL LEVEL ADJUSTMENT AND STARTUP FUNCTIONS

CROSS-REFERENCE TO RELATED APPLICATIONS

This application is based upon and claims the benefits of priority from the prior Japanese Patent Application No. 2004-007857, filed on Jan. 15, 2004, the entire contents of which are incorporated herein by reference.

BACKGROUND OF THE INVENTION

1. Field of the Invention

The present invention relates to an optical transmission system, and more particularly to an optical transmission system which transports optical signals using wavelength-division multiplexing techniques.

2. Description of the Related Art

Wavelength-division multiplexing (WDM) techniques are widely used in today's optical communications infrastructures. A WDM system carries many transmission signals (e.g., forty to one hundred waves) over a single fiber-optic medium, with different optical wavelengths assigned to different channels. Long-haul WDM systems employ a number of optical amplifiers to boost optical signals. They include: preamplifiers, post-amplifiers, and inline amplifiers. Preamplifiers are placed at the front end of each node to receive and amplify WDM signals received from the preceding node. Post-amplifiers are placed at the output of each node to increase the power of processed WDM signals before they are transmitted to the next node. Inline amplifiers are intermediate boosters placed at one or more points on a repeater section between a sending node and a receiving node.

The input dynamic range of optical amplifiers designed for a WDM system is typically 7 to 12 dB. Large input signals above this range would worsen the noise factor (NF) or produce an increased gain tilt over multiple signal wavelengths. To avoid those problems, optical signals have to be adjusted to an appropriate power level to meet the dynamic range requirement of an amplifier before they are supplied thereto.

The fiber-optic transmission lines of a WDM network may be segmented into a plurality of sections separated by intermediate repeater devices. Each repeater section has a different amount of signal power loss, depending on the length and type of the fiber that is used. It is therefore important to set the input power level of preamplifiers and inline amplifiers, which receive and amplify optical signals to help them propagating over a transmission line. Such input level adjustment has conventionally been achieved by inserting an optical attenuator with a fixed attenuation ratio, or by manually tuning the attenuation ratio of a variable attenuator that is employed in each network node.

FIG. 20 shows signal power level adjustment in a conventional WDM system, focusing on its essential elements for explanatory purposes. The illustrated system includes a fiber-optic transmission line that connects two end nodes 110 and 120 via a repeater node 130 disposed between them. The nodes 110 and 120 are optical add/drop multiplexers (OADM), which extract optical signals with particular wavelengths out of the incoming WDM signals and insert new optical signals to outgoing WDM signals, which are referred as "drop" and "add" functions, respectively. Attached to the leftmost node 110 in FIG. 20 is a transponder 111, which converts wavelengths or interface of signals supplied from a tributary to add them into the outgoing WDM optical stream. The repeater node 130 contains an attenuator (ATT) 131 and an inline amplifier (ILA) 132. The receiving node 120 has an attenuator 121, a preamplifier 122, and a post-amplifier 123.

As part of a system setup process, optical attenuators have to be tuned to provide an appropriate level of signal reduction. The attenuator adjustment needs some amount of input light, and it is typical to use add-channel optical signals from a transponder for this purpose. In the example of FIG. 20, the transponder 111 serves as a light source for attenuator adjustment, delivering add-channel light through the node 110. To start up this conventional WDM system, a service engineer conducts a power level measurement at point p1 in the repeater node 130. This measurement yields the intensity of the add-channel optical signal received over the first repeater section A1. Based on the measurement result, he/she then adjusts the attenuator 131 so that the observed signal level at point p1 will match with a specified input level that the inline amplifier 132 requires.

In the case the attenuator 131 is a fixed attenuator, the service engineer has to remove it (and give a bypass to make optical signals go through) before conducting the above measurement at point p1. The measurement permits him/her to determine how much attenuation is required and thus to choose and insert an appropriate fixed attenuator that reduces the signal strength by the required amount.

The attenuator 131 will be allowed to sit there if it is a variable attenuator. In this case, the service engineer first sets up the attenuator 131 with a minimum attenuation (so that the signal can just go through it) before measuring the signal power level at point p1. He/she then adjusts the attenuator 131 manually to bring the signal to a desired power level.

The same adjustment procedure is applied to another point p2, at which an optical signal coming over the next repeater section A2 is observed. The service engineer measures the power level of this signal and configures the attenuator 121 in the receiving node 120, so that the observed signal level at point p2 will match with a required input level of the preamplifier 122.

With both attenuators 131 and 121 adjusted, the inline amplifier 132, preamplifier 122, and post-amplifier 123 are now receiving add-channel optical signals with intended amplitudes. The amplifiers are thus allowed to enter a specified control mode, which may be automatic level control (ALC) mode or automatic gain control (AGC) mode. ALC mode regulates the output power level of an optical amplifier, canceling the effect of input power fluctuations. In ALC mode, the power of each wavelength is maintained at a constant level, meaning that the target power level is a function of the number of wavelengths. AGC mode, on the other hand, tries to maintain the gain of an optical amplifier at a given value. Every optical attenuator in the system is adjusted in this way, and every optical amplifier is brought to a prescribed operational state, whereby the entire system can start to run.

A more specific example of a conventional technique is disclosed in the Japanese Patent Application Publication No. 2003-174421, in which paragraphs [0020] to [0119] and FIG. 6 are particularly relevant. This literature proposes a technique to stabilize the optical amplifier output by adjusting an optical attenuator placed at the input end of the amplifier, such that the output power will be maintained at a particular level specified through a supervisory control signal.

One thing to consider about attenuator adjustment is that it is a series of manual tasks performed by service engineers. This fact means the following problems: First, such tasks are not error free. Second, they need knowledge and skills. Third, they are quite time-consuming since adjustment should take place at each individual node.

To address the problems enumerated above, some systems use remotely-controllable variable attenuators. Those attenuators can communicate with a remote site through the use of appropriate protocols, such as the Transaction Language 1 (TL1), a set of network management commands developed by Telcordia Technologies Inc (formerly Bellcore). This type of variable attenuators permit an engineer to monitor their input power levels and set attenuation depths by sending commands and receiving response messages.

Although the workload of attenuator adjustment can be reduced by the use of such remote control facilities, service engineers are still burdened with some amount of manual tasks that they have to perform through a terminal console. Also, the remote attenuator control requires the system to provide an additional interface environment for that purpose.

Another issue to consider here is how to supply optical power for attenuator adjustment. As mentioned earlier, one option for this is to use an add-channel signal from a transponder. In this case, however, an additional system has to be organized for startup processing using transponders as a light source. Since telecommunications carriers direct their efforts toward quick service provisioning at minimum cost, their recent approach is to install transponders on an "on-demand" basis. That is, they construct a new WDM system without transponders connected. When a specific service demand arises, they attach transponders to the existing multiplexer/demultiplexer equipment to provide service. This means that there are no transponders when we need them to use as an optical power source for attenuator adjustment.

Another difficulty lies in the fact that some systems have protection links to back up working links for enhanced availability and reliability. Protection links carry no optical signals in normal circumstances, as mentioned in paragraph [0102] of the Japanese Patent Application Publication No. 2003-174421. This means that we have to prepare some other light source for adjustment of attenuators on a protection link.

For the above reasons, optical transmission systems need improved startup functions that do not require signal light from transponders. It is, however, costly and inefficient to employ a separate light source with a variable wavelength only for that purpose.

SUMMARY OF THE INVENTION

In view of the foregoing, it is an object of the present invention to provide an optical transmission system with automatic startup functions that optimize the power level of optical signals entering each optical amplifier, as well as operating each optical amplifier in appropriate mode, so that the system will be easier to operate and maintain.

To accomplish the above object, the present invention provides an optical transmission system for transporting optical signals over downstream and upstream optical transmission lines. This system comprises downstream and upstream optical transmission devices. The downstream optical transmission device has first and second optical transmission units and a downstream device controller for controlling them. Likewise, the upstream optical transmission device has third and fourth optical transmission units and an upstream device controller for controlling them.

In the downstream optical transmission device, the first optical transmission unit receives downstream optical signals from the downstream optical transmission line, which comprises a preamplifier unit to amplify incoming optical signals and a downstream-device variable optical attenuator disposed before the preamplifier unit to attenuate the incoming optical signals. The second optical transmission unit is oriented in the opposite direction to the first optical transmission unit to transmit upstream optical signals over the upstream optical transmission line. The downstream device controller adjusts the downstream-device variable optical attenuator by utilizing incoming optical noise and selects and sets operating mode of the preamplifier unit during an automatic startup process.

In the upstream optical transmission device, the third optical transmission unit transmits downstream optical signals over the downstream optical transmission line, which comprises a post-amplifier unit to amplify optical signals for transmission. The fourth optical transmission unit is oriented in the opposite direction to the third optical transmission unit to receive upstream optical signals from the upstream optical transmission line. The upstream device controller causes the post-amplifier unit to emit optical noise and selects and sets operating mode of the post-amplifier unit, while exchanging messages with the downstream device controller over a supervisory control channel during the automatic startup process.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
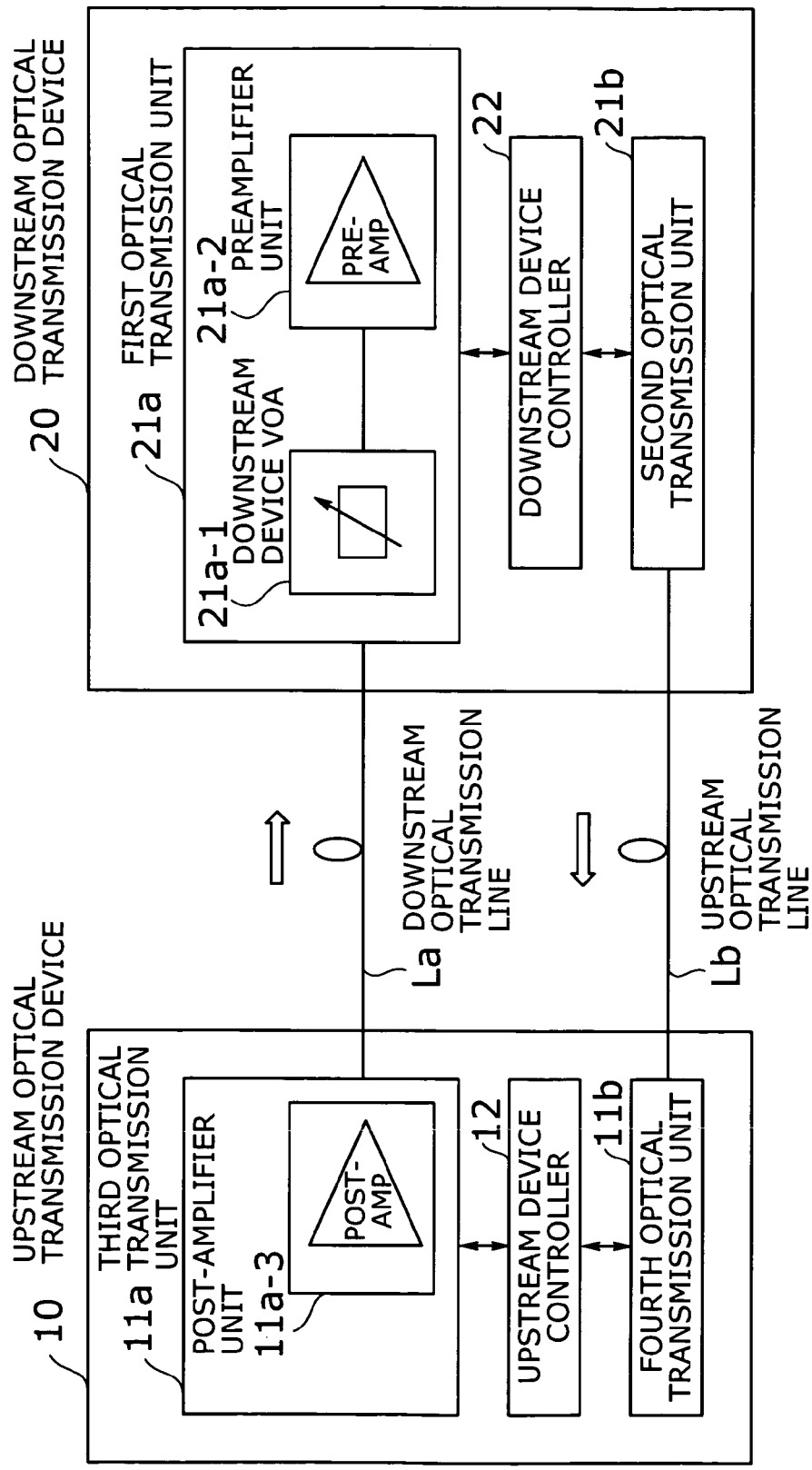
FIG. 1 is a conceptual view of an optical transmission system according to the present invention.

Preferred embodiments of the present invention will be described below with reference to the accompanying drawings, wherein like reference numerals refer to like elements throughout.

FIG. 1 is a conceptual view of an optical transmission system according to the present invention. The illustrated optical transmission system 1 carries optical signals with WDM techniques over upstream and downstream optical transmission lines. The system 1 comprises two optical transmission devices 10 and 20 located in upstream and downstream nodes, respectively. The structure is simplified for explanatory purposes; an actual system may, of course, have more network nodes including intermediate repeaters.

The downstream optical transmission device 20 comprises a first optical transmission unit 21a, a second optical transmission unit 21b, and a downstream device controller 22. The first optical transmission unit 21a receives downstream optical signals over a downstream optical transmission line La (hereafter, "downstream line"). The first optical transmission unit 21a has, among others, a preamplifier unit 21a-2 to amplify incoming optical signals and a downstream-device variable optical attenuator (VOA) 21a-1 placed before the preamplifier unit 21a-2 to attenuate the incoming optical signals. The second optical transmission unit 21b is oriented in the opposite direction to the first optical transmission unit 21a to transmit upstream optical signals over an upstream optical transmission line Lb (hereafter, "upstream line").

The downstream device controller 22 controls the entire operation of the downstream optical transmission device 20, including messaging through supervisory control channels for setup and maintenance purposes. Specifically, in an automated process of starting up optical transmission on the downstream line La, the downstream device controller 22 interacts with the upstream optical transmission device 10 to adjust the downstream-device VOA 21a-1 by utilizing optical noise emission, as well as to select and set operating mode of the preamplifier unit 21a-2.

The supervisory control channels mentioned above include, but are not limited to, control signals of what is known as the optical supervisory channel (OSC) in this technical field. OSC is used to configure, operate, supervise a WDM system, including detect-on of transmission line failure. OSC signals travel at a speed of 1.5 to 150 Mb/s, without passing through optical amplifiers.

The light used in attenuator adjustment is background noise, known as amplified spontaneous emission (ASE), produced in Erbium-doped fiber (EDF) amplifiers. EDF amplifiers (EDFA) are widely used in today's optical communications systems. They are formed from a section of optical fiber with a small amount of Erbium ions ($Er^{3+}$) added for use as the amplification medium. The optical amplification is achieved by stimulated emission of photons which occurs when a pump light beam launched into the Er-doped fiber medium travels alongside the signal light that needs boosting. This type of optical fiber amplifiers, however, produce internal noise due to spontaneous emission of light, irrespective of whether an optical input signal is present or not. Such noise light appearing at the output of an amplifier is referred to as "optical noise" or "ASE light" in the present invention.

Referring again to FIG. 1, the upstream optical transmission device 10 comprises a third optical transmission unit 11a, a fourth optical transmission unit 11b, and an upstream device controller 12. The third optical transmission unit 11a contains a post-amplifier unit 11a-3 to amplify outgoing optical signals for transmission over the downstream line La. The fourth optical transmission unit 11b is oriented in the opposite direction to the third optical transmission unit 11a to receive and amplify upstream optical signals from the upstream line Lb.

The upstream device controller 12 controls the entire operation of the upstream optical transmission device 10, including message exchange through supervisory control channels, or OSC. Specifically, in an automated process of starting up optical transmission on the downstream line La, the upstream device controller 12 causes its local post-amplifier unit 11a-3 to produce optical noise. It also selects and sets the operating mode of the post-amplifier unit 11a-3, while interacting with the downstream optical transmission device 20 via the OSC facilities. This system startup control of the present invention will be described in detail later with reference to flowcharts and state transition diagrams.

First Embodiment

This section describes a more specific structure of the optical transmission system 1 according to the present invention. The following explanation, however, assumes a system with an intermediate repeater device, which is not shown in the simplified system of FIG. 1.

Figure 2:
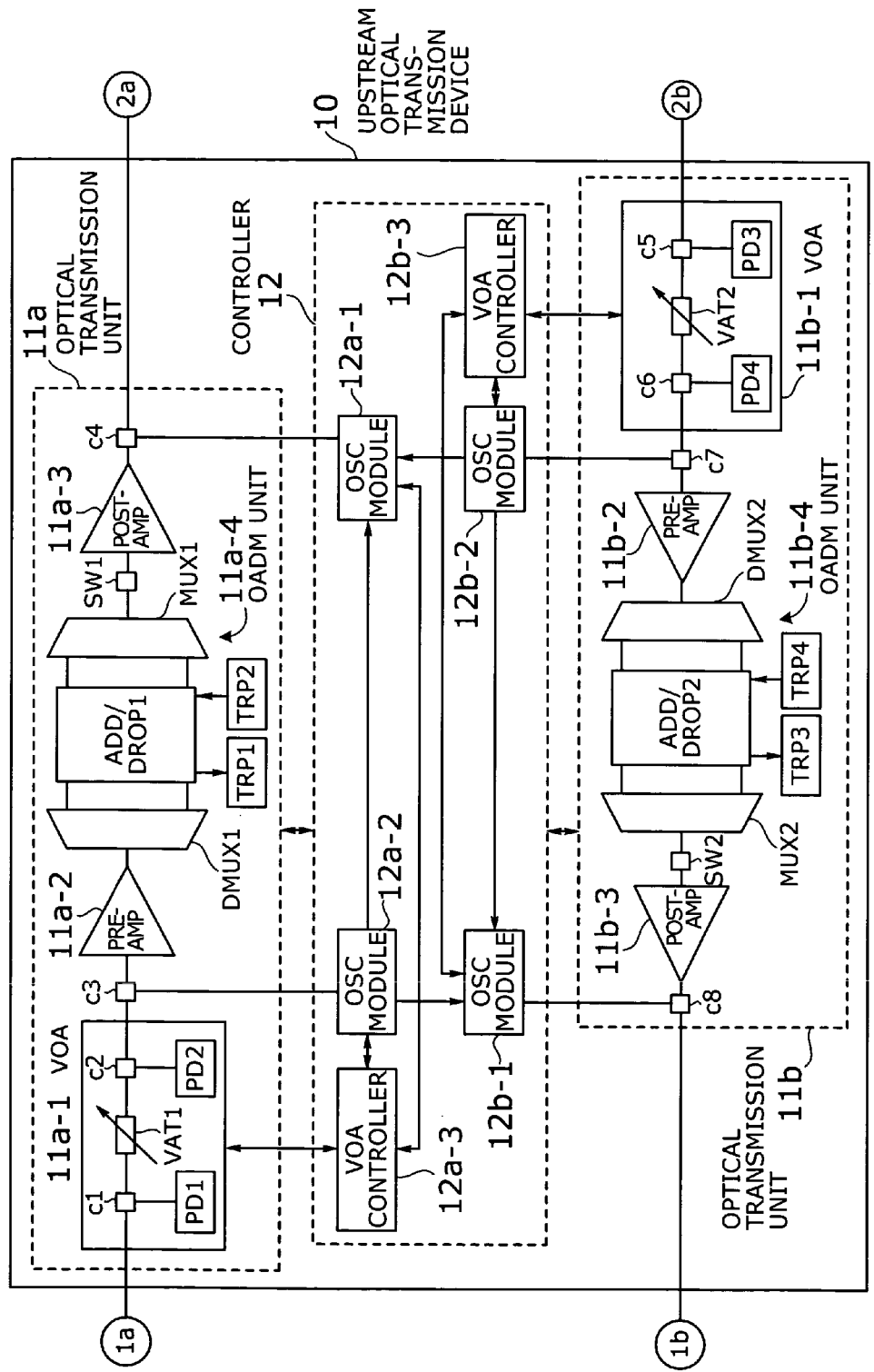
FIGS. 2 to 4 show the structure of an optical transmission system according to a first embodiment of the present invention.
Figure 3:
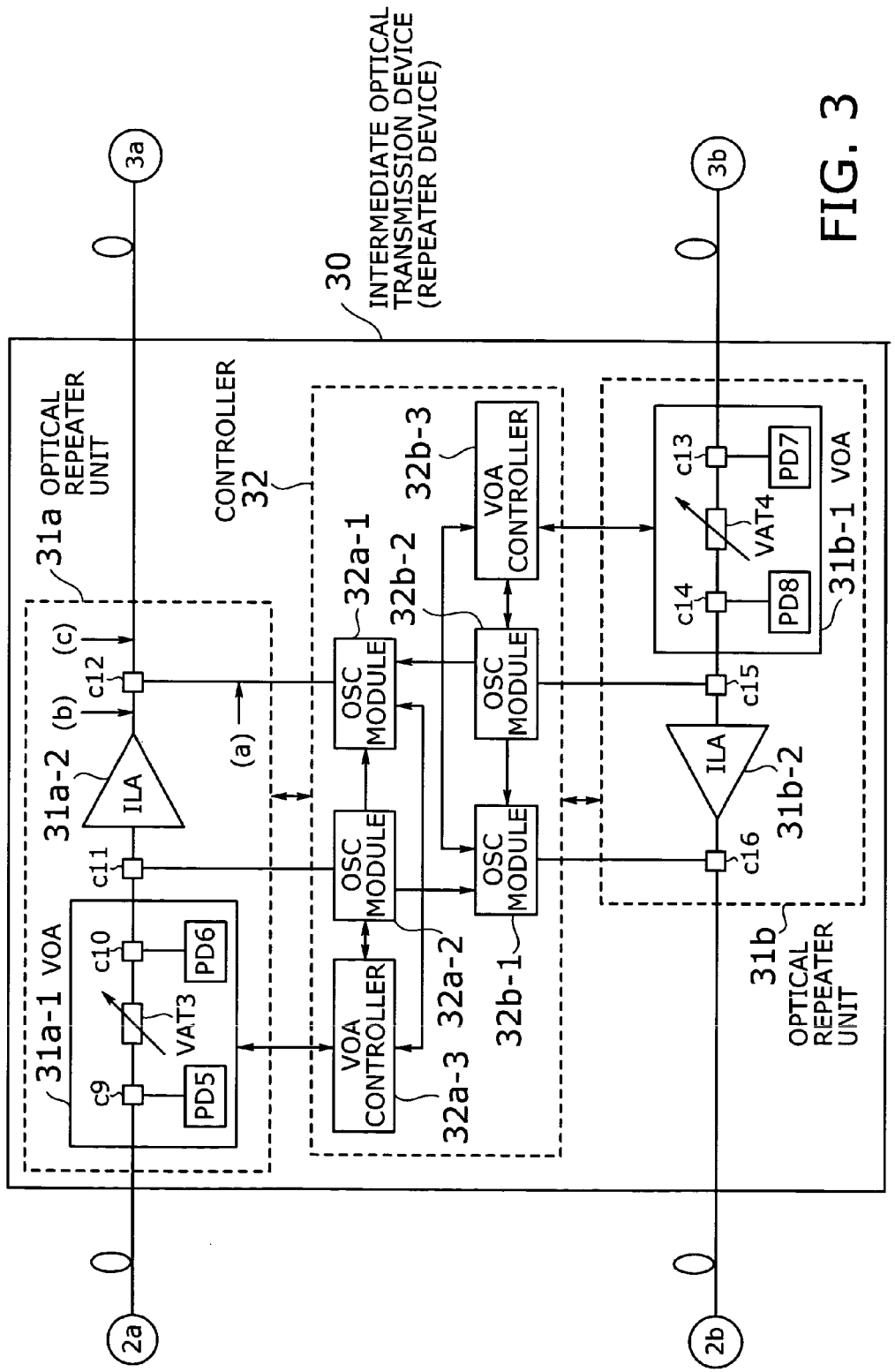
Figure 4:
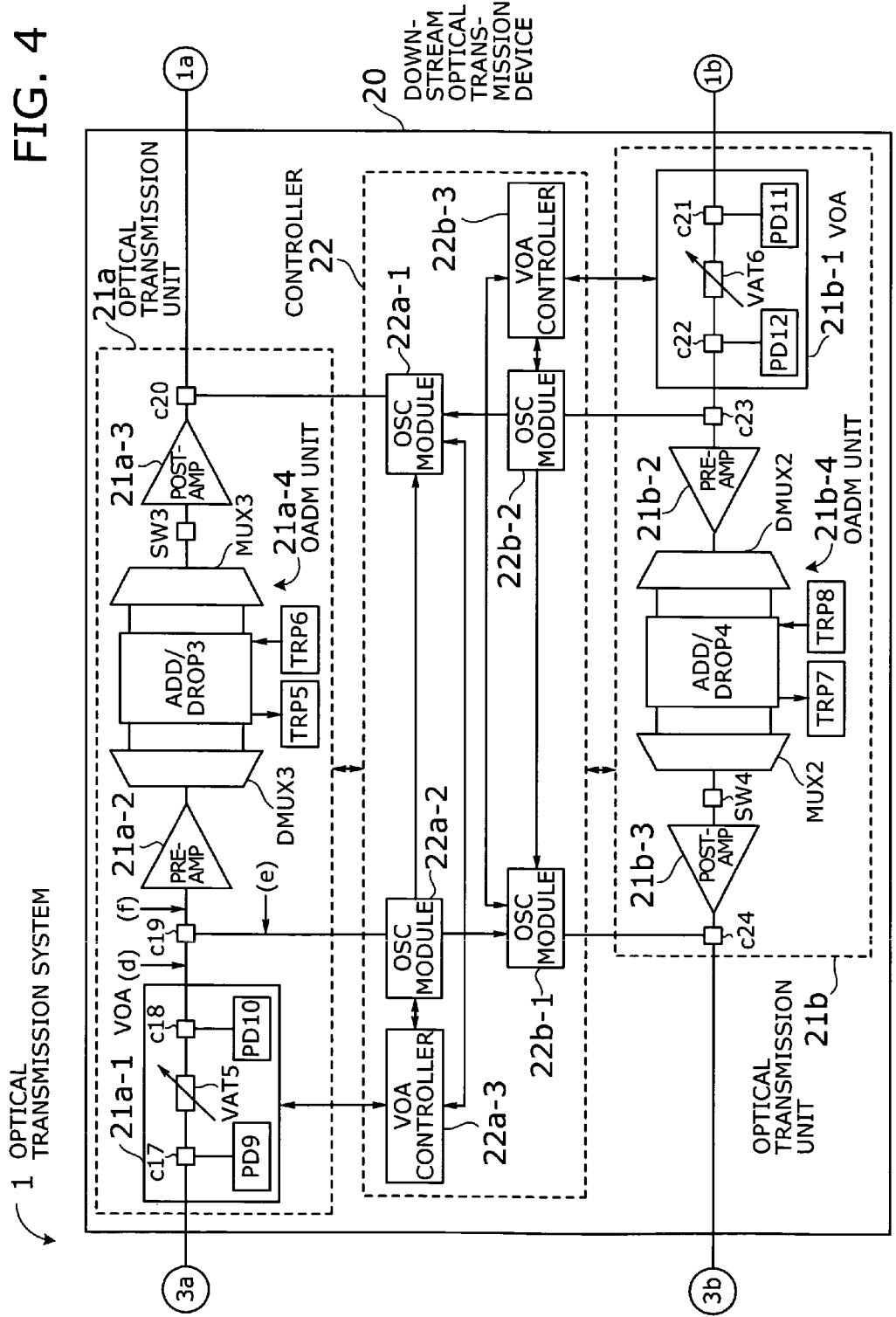

FIGS. 2 to 4 show the structure of an optical transmission system 1 according to a first embodiment of the present invention. Specifically, FIG. 2 shows an upstream optical transmission device 10 (referred to as "transmission device 10" where appropriate). FIG. 3 shows an intermediate optical transmission device 30 (referred to as "repeater device 30" where appropriate). FIG. 4 shows a downstream optical transmission device 20 (referred to as "transmission device 20" where appropriate).

Note that the terms "upstream" and "downstream" are used in a relative sense; that is, those labels of optical transmission devices depend on their relative locations. Think of, for example, two devices illustrated in a diagram and a main information signal flows between them, from left to right on that diagram. Then one device on the left-hand side is called "upstream device," while the other device on the right-hand side is called "downstream device." Specifically, the transmission device 10 shown in FIG. 2 is upstream of the repeater device 30 shown in FIG. 3, and the repeater device 30 is upstream of the transmission device 20 shown in FIG. 4.

Regarding the symbols (a) to (f) in FIGS. 3 and 4, we will use them later in the section for a third embodiment of the invention.

Referring now to FIG. 2, the transmission device 10 has two optical transmission units 11a and 11b (corresponding respectively to the third and fourth optical transmission units in FIG. 1) and a controller 12 (corresponds to the upstream device controller in FIG. 1) for them. The optical transmission unit 11a includes a variable optical attenuator (VOA) 11a-1, a preamplifier unit 11a-2, a post-amplifier unit 11a-3, and an OADM unit 11a-4, where the post-amplifier unit 11a-3 is composed of an optical switch SW1 and an optical post-amplifier. Also included in the optical transmission unit 11a are couplers c1 to c4. The VOA 11a-1 has, among others, photodiodes PD1 and PD2 and a variable attenuator VAT1. This VOA 11a-1 is placed at the front end of the preamplifier unit 11a-2. The OADM unit 11a-4 has a demultiplexer DMUX1, an add/drop unit ADD/DROP1, a multiplexer MUX1, and transponders TRP1 and TRP2. While not illustrated in FIG. 2, user equipment is coupled to the lower-end port of each transponder.

Similar to the above, the other optical transmission unit 11b includes a VOA 11b-1, a preamplifier unit 11b-2, a post-amplifier unit 11b-3, and an OADM unit 11b-4, where the post-amplifier unit 11b-3 is composed of an optical switch SW2 and an optical post-amplifier. Also included in the optical transmission unit 11b are couplers c5 to c8. The VOA 11b-1 has, among others, photodiodes PD3 and PD4 and a variable attenuator VAT2. This VOA 11b-1 is placed at the front end of the preamplifier unit 11b-2. The OADM unit 11b-4 has a demultiplexer DMUX2, an add/drop unit ADD/DROP2, a multiplexer MUX2, and transponders TRP3 and TRP4.

The controller 12 has OSC modules 12a-1, 12a-2, 12b-1, and 12b-2 to control OSC signal transmission. Also included in the upstream device controller 12 are VOA controllers 12a-3 and 12b-3 that control two VOAs 11a-1 and 11b-1, respectively.

Referring to FIG. 3, the repeater device 30 has two optical repeater units 31a and 31b (also referred to as "first and second optical repeater units") and a controller 32 (also referred to as "repeater device controller") for them. The optical repeater unit 31a has, among others, a VOA 31a-1 and an inline amplifier unit 31a-2, which include couplers c9 to c12. The VOA 31a-1 has, among others, photodiodes PD5 and PD6 and a variable attenuator VAT3. This VOA 11b-1 is placed at the front end of the inline amplifier unit (ILA) 31a-2.

The optical repeater unit 31b has, among others, a VOA 31b-1 and an inline amplifier unit 31b-2, which include couplers c13 to c16. The VOA 31b-1 has, among others, photodiodes PD5 and PD6 and a variable attenuator VAT3. This VOA 31b-1 is placed at the front end of the inline amplifier unit (ILA) 31b-2.

The controller 32 has OSC modules 32a-1, 32a-2, 32b-1, and 32b-2 to control OSC signal transmission. Also included in the controller 32 are VOA controllers 32a-3 and 32b-3 that control two VOAs 31a-1 and 31b-1, respectively.

Referring to FIG. 4, the transmission device 20 has two optical transmission units 21a and 21b (corresponding respectively to the first and second optical transmission units in FIG. 1) and a controller 22 (corresponds to the downstream device controller in FIG. 1) for them. The optical transmission unit 21a includes a VOA 21a-1, a preamplifier unit 21a-2, a post-amplifier unit 21a-3, and an OADM unit 21a-4. Also included in the optical transmission unit 21a are couplers c17 to c20. The VOA 21a-1 has, among others, photodiodes PD9 and PD10 and a variable attenuator VAT5. This VOA 21a-1 is placed at the front end of the preamplifier unit 21a-2. The OADM unit 21a-4 has a demultiplexer DMUX3, an add/drop unit ADD/DROP3, a multiplexer MUX3, and transponders TRP5 and TRP6.

The optical transmission unit 21b is formed from a VOA 21b-1, a preamplifier unit 21b-2, a post-amplifier unit 21b-3, and an OADM unit 21b-4. Also included in the optical transmission unit 21b are couplers c21 to c24. The VOA 21b-1 has, among others, photodiodes PD11 and PD12 and a variable attenuator VAT6. This VOA 21b-1 is placed at the front end of the preamplifier unit 21b-2. The OADM unit 21b-4 has a demultiplexer DMUX4, an add/drop unit ADD/DROP4, a multiplexer MUX4, and transponders TRP7 and TRP8.

The controller 22 has OSC modules 22a-1, 22a-2, 22b-1, and 22b-2 to control OSC signal transmission. Also included in the controller 22 are VOA controllers 22a-3 and 22b-3 that control two VOAs 21a-1 and 21b-1, respectively.

Before moving into the details of the startup process according to the present invention, we will give below a brief explanation of the flow of main optical signals. Since the system operates symmetrically in both directions, we will only describe the downstream line, where the signals from the transmission device 10 propagate to the repeater device 30 and then to the transmission device 20.

In the transmission device 10, the VOA 11a-1 attenuates the WDM signals received from the transmission device 20 located upstream, so that their power level will be adjusted to a specified input level that the preamplifier unit 11a-2 requires. To this end, its integral photodiode PD1 is used to monitor the optical power of input signals entered through a coupler c1. The observed input power value is then sent to the VOA controller 12a-3. Another photodiode PD2 is used to monitor the output optical power of the variable attenuator VAT1 through a coupler c2. The observed output power value is then sent to the VOA controller 12a-3. Those input and output power values permit the VOA controller 12a-3 to perform feedback control of the variable attenuator VAT1 in such a way that the output-to-input ratio will be maintained at a constant value that is previously determined at the time of startup. In other words, the VOA controller 12a-3 controls the variable attenuator VAT1 by varying a current that sets its attenuation level, so that the loss of the variable attenuator VAT1 will not change, even in such environments where the characteristics of components may change over time due to the temperature variations or age deterioration.

The preamplifier unit 11a-2 amplifies WDM signals. The DMUX1 splits the received WDM signals into separate wavelengths. From among those separate wavelength signals, the add/drop unit ADD/DROP1 chooses a particular wavelength signal and directs it to a transponder TRP1. The transponder TRP1 converts the wavelength or interface of that optical signal for delivery to a tributary. Another transponder TRP2 works in the opposite way; i.e., it receives a signal from a tributary and converts its wavelength or interface to supply the add/drop unit ADD/DROP1 with an add-channel input. The add/drop unit ADD/DROP1 supplies the multiplexer MUX1 with the separate wavelength signals and the add-channel optical signal from the transponder TRP2. The multiplexer MUX1 combines multiple wavelength signals into a single optical beam, thus producing outgoing WDM signals for transmission over the optical transmission line.

In the repeater device 30, the VOA 31a-1 attenuates WDM signals received from the transmission device 10, so that their power level will be adjusted to a specified input level that the inline amplifier unit 31a-2 requires. The inline amplifier unit 31a-2 boosts the adjusted WDM signals for transmission over the next section of the optical transmission line.

In the transmission device 20, the VOA 21a-1 attenuates the WDM signals received from the repeater device 30, so that their power level will be will be adjusted to a specified input level that the preamplifier unit 21a-2 requires. The preamplifier unit 21a-2 boosts the adjusted WDM signals for processing in the subsequent OADM unit 21a-4. The OADM unit 21a-4 drops some signals and adds new signals, thus producing a new set of WDM signals. The post-amplifier unit 21a-3 boosts those WDM signals before sending them to the optical transmission line for delivery to the transmission device 10.

A more specific example of an OADM unit is shown in FIG. 2 of Japanese Patent Application Publication No. 2003-163641. Variable attenuators VAT3 and VAT5 shown in FIGS. 3 and 4 are controlled in the same way as the variable attenuator VAT1 that we described in FIG. 2. As to the structure of inline amplifiers and preamplifiers, see, for example, Japanese Patent Application Publication No. 2003-174421. Particularly, optical amplifiers disclosed in FIGS. 6 and 12 can regulate the signal level of each wavelength even when they encounter a sudden change in the number of wavelengths. The structure of FIG. 12 makes it possible for an optical amplifier to keep its normal gain even if no signals are present at its input end.

Figure 5:
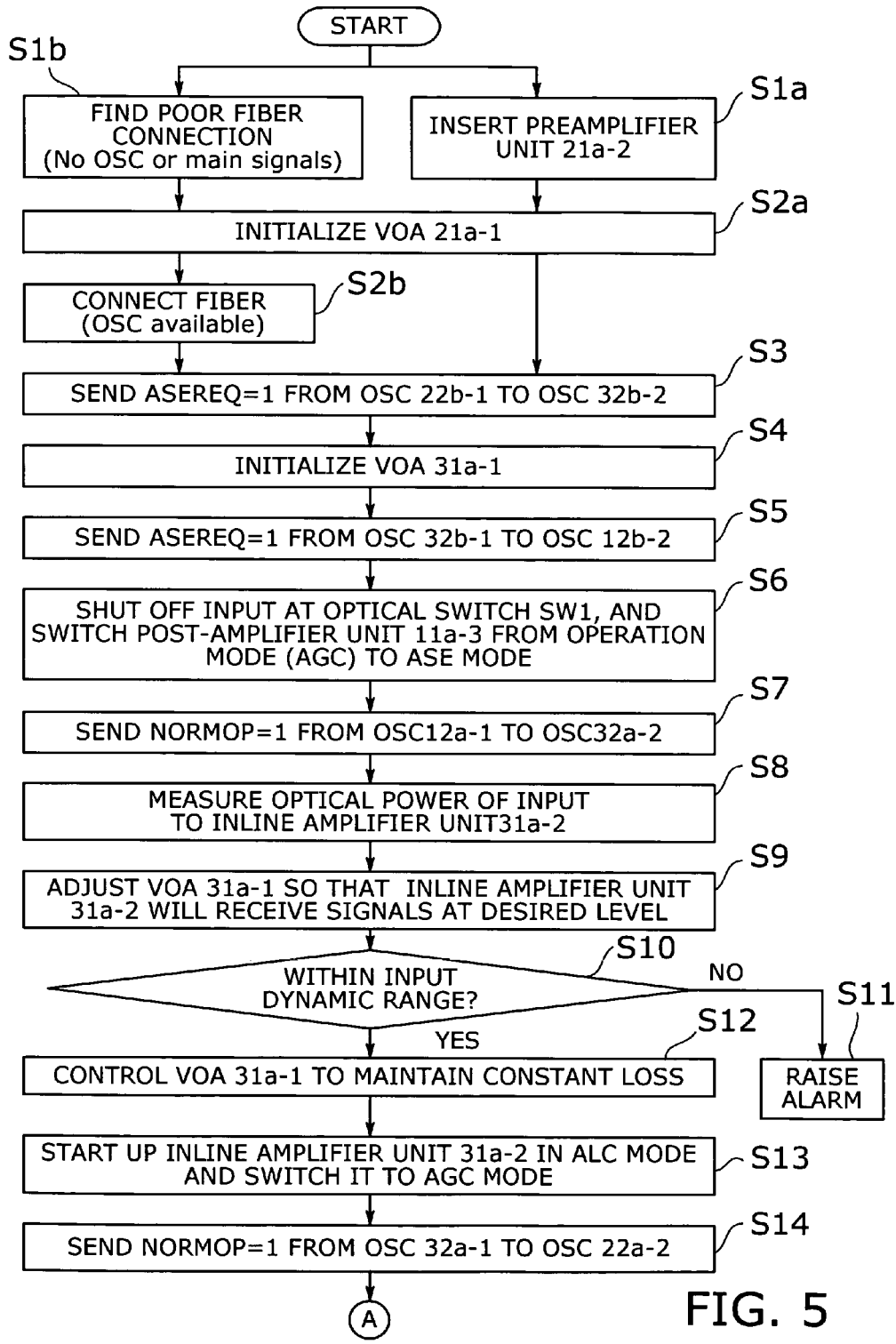
FIGS. 5 and 6 show a flowchart of an automatic startup process according to the first embodiment of the invention.
Figure 6:
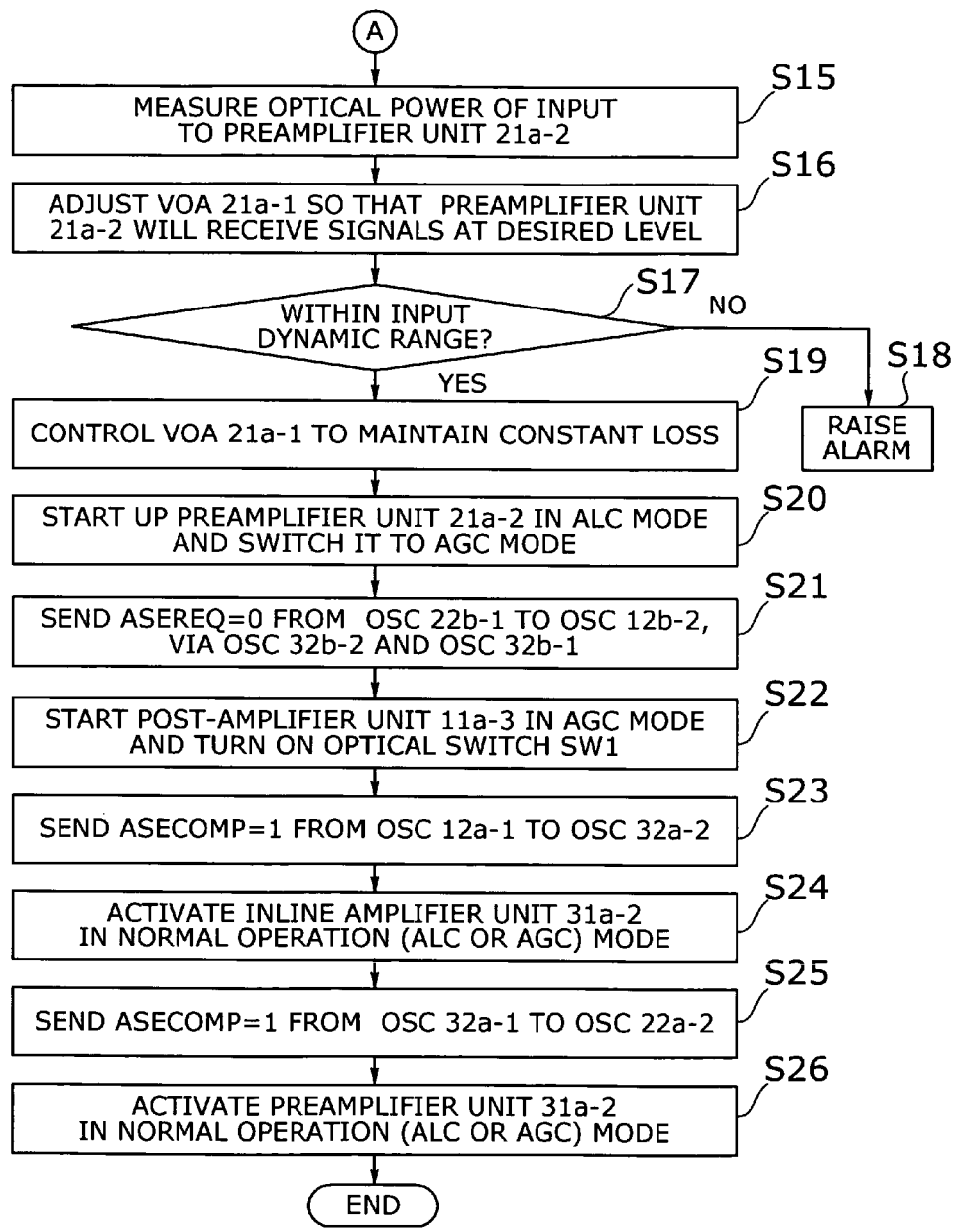

Referring now to FIGS. 5 and 6, we will now describe in detail the automatic startup process of the optical transmission system 1 shown in FIGS. 2 to 4. The explanation will concentrate on the downstream direction (or the main signal flow from left to right in those figures) since the system is symmetric and both the upstream and downstream lines start up in the same way.

Figure 7:
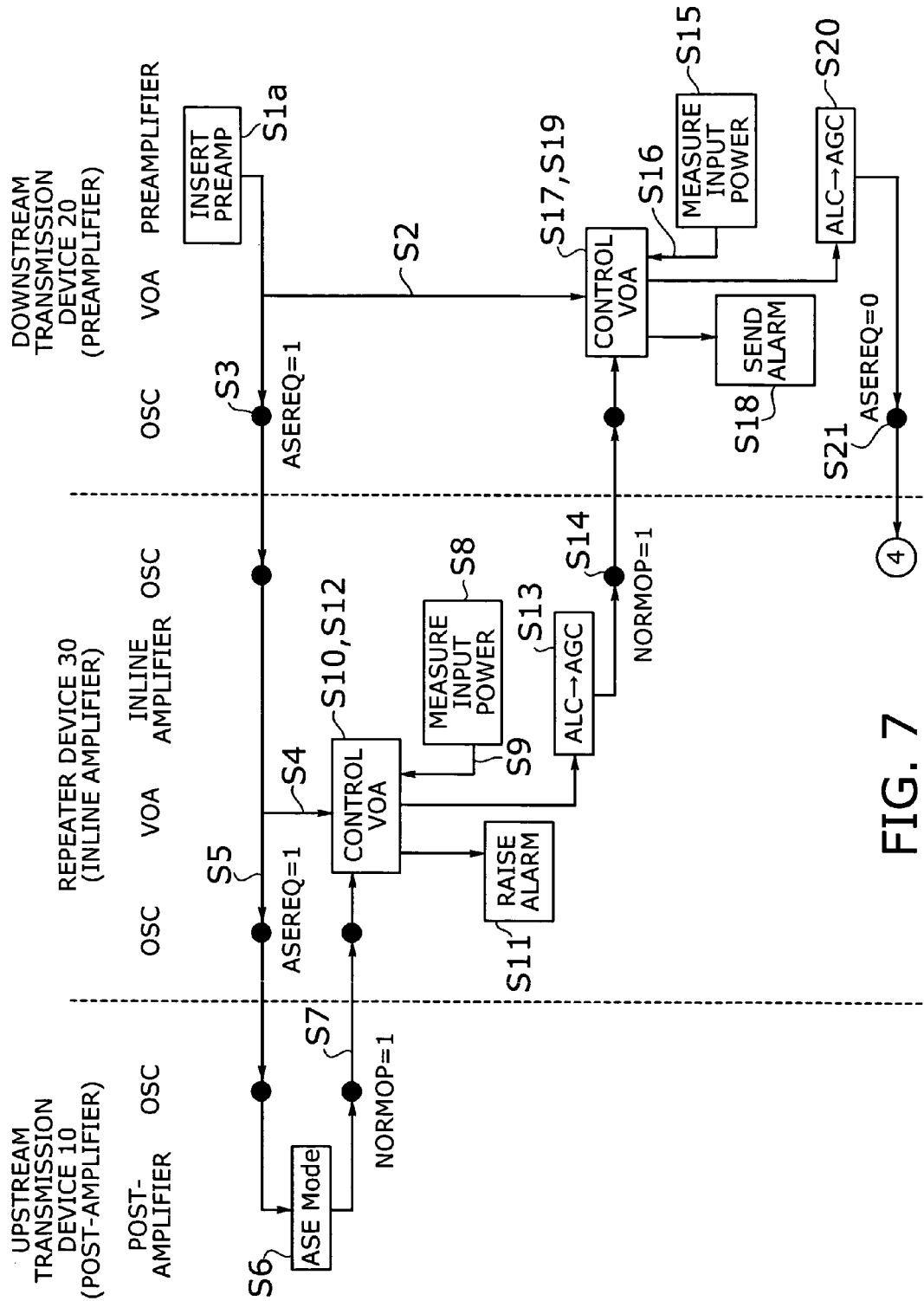
FIGS. 7 and 8 show a state transition diagram of the automatic startup process according to the first embodiment of the invention.
Figure 8:
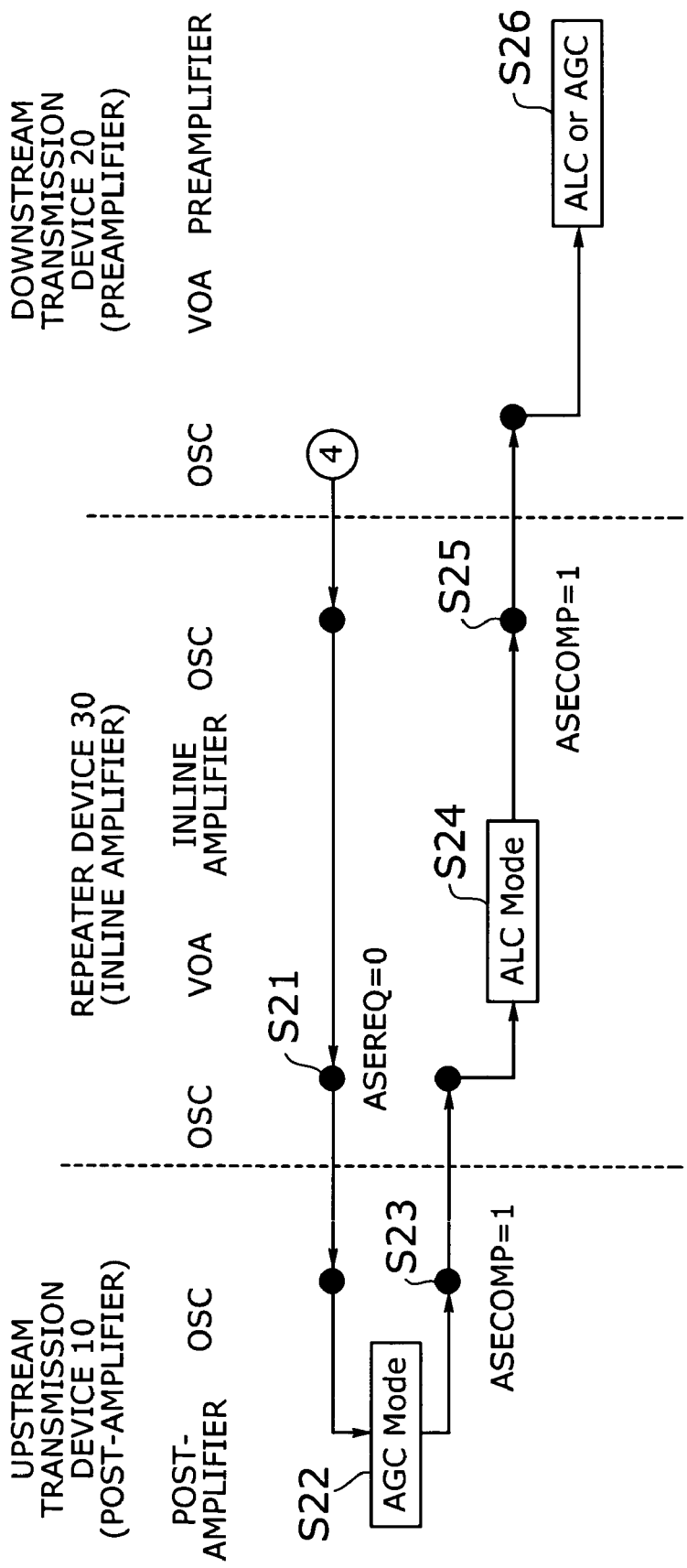

FIGS. 5 and 6 show a flowchart of an automatic startup process according to the first embodiment of the invention, and FIGS. 7 and 8 present a state transition diagram of the same. The step numbers in the flowchart are consistent with those in the state transition diagram. The process goes as follows:

(S1a) A service engineer inserts a preamplifier unit 21a-2 to the transmission device 20. This event triggers the controller 22 to begin startup processing. Note that OSC signals have to be available at this stage.

(S1b) The controller 22 examines whether OSC signals and main signals are available on the receiving transmission line. This test reveals poor fiber connection, if any.

(S2a) The event at step S1a or step S1b causes the controller 22 to execute the following: Upon insertion of a preamplifier unit 21a-2 at step S1a, the VOA controller 22a-3 immediately initializes the corresponding VOA 21a-1 to a predetermined attenuation level, permitting an OSC module 22a-2 to receive a sufficient amount of optical input power.

The process then advances to step S3. Or, upon detection of poor fiber connection at step S1b, the VOA controller 22a-3 initializes the VOA 21a-1 in the same way as in the former case, before advancing the process to step S2b.

(S2b) With the presence of OSC signals coming from a remote OSC module 32a-1, the OSC module 22a-2 finds it as a trigger to an automatic startup process. More specifically, the controller 22 is designed to detect poor fiber connection when neither main optical signals nor OSC signals are found. The downstream device controller 22 interprets in turn the presence of OSC signals as a sign of recovery from a fiber-related problem. It therefore invokes a startup process (or restart process) upon detection of OSC signals, whether main optical signals are available or not.

(S3) The controller 22 sends an upstream OSC message ASEREQ=1 from its local OSC module 22b-1 to a remote OSC module 32b-2. ASEREQ messages represent a request for emission of ASE light (ASEREQ=1), or termination thereof (ASEREQ=0).

(S4) The receiving VOA controller 32a-3 initializes its local VOA 31a-1 to a predetermined attenuation level.

(S5) The controller 32 sends an upstream OSC message ASEREQ=1 from its local OSC module 32b-1 to a remote OSC module 12b-2.

(S6) Upon receipt of the message ASEREQ=1, the controller 12 shuts off the post-amplifier input at an optical switch SW1, thus causing the post-amplifier unit 11a-3 to operate in ASE mode (noise emission mode). Normally the post-amplifier unit 11a-3 maintains a specified constant gain (i.e., AGC is enabled), so that it will be able to produce predetermined power when input signals are available. At this step S6, however, the post-amplifier unit 11a-3 receives no input signals from preceding stages, and thus it delivers ASE light alone, which comes out of its own post-amplifier. The post-amplifier unit 11a-3 further increases the intensity of the ASE light up to a power level that is equivalent to one (or more) signal wave(s). The resulting gain of the amplifier is greater than that in the normal operating condition. The optical switch SW1 blocking the input permits the post-amplifier unit 11a-3 to keep its output at a stable power level.

(S7) The controller 12 sends an OSC message NORMOP=1 from its local OSC module 12a-1 to a remote OSC module 32a-2. NORMOP=1 indicates that the requested ASE light is now available.

(S8) The controller 32 of the repeater device 30 measures optical input power at the front end of the inline amplifier unit 31a-2.

(S9) The VOA controller 32a-3 varies the attenuation ratio of its local VOA 31a-1 in such a way that the measurement value of optical input power will agree with the target power level that the inline amplifier unit 31a-2 requires.

Suppose, for example, that the inline amplifier of interest has an input dynamic range of −20 dBm to −13 dBm per channel in terms of the average power of each wavelength. Assuming that the sending post-amplifier is producing ASE light equivalent to a single wavelength signal, the VOA 31a-1 is adjusted such that the preamplifier input will be −16 dBm. In this way, the target level is set to be above the lower bound of the given input dynamic range to achieve a higher optical signal-to-noise ratio (SNR) If the target power level is reached, then the process advances to step S12.

(S10) If the preceding step S9 has failed to adjust the input power exactly to the desired level, it is then determined whether the best result of adjustment is within the required input dynamic range of the inline amplifier unit 31a-2. If this condition is met, the process advances to step S12. If not, the process branches to step S11.

(S11) The unsuccessful adjustment of optical input power suggests the presence of some problem such as fiber break or poor cable connection. The controller 32 then raises an alarm to service engineers.

More specifically, the VOA 31a-1 is supposed to receive ASE light with an intensity equivalent to a single normal signal wave as long as there is no problem with the transmission line between the transmission device 10 and repeater device 30. In this condition, the VOA 31a-1 has to be able to provide an appropriate attenuation to meet the input dynamic range requirement of the inline amplifier unit 31a-2. However, if the transmission line had a problem like fiber break, connector contamination, or loose connection, the VOA 31a-1 would never be able to satisfy the requirement of the inline amplifier unit 31a-2 because of the insufficient intensity of incoming ASE light. The controller 32 is therefore designed to alert service engineers in such a problem situation.

(S12) The controller 32 records the attenuation ratio of the VOA 31a-1 that was determined at steps S9 and S10, thus controlling the VOA 31a-1 to keep that attenuation ratio.

More specifically, the controller 32 monitors optical power levels at the input and output of the VOA 31a-1 by using two photodiodes PD5 and PD6, respectively. The current attenuation ratio is calculated from those monitored values, and the controller 32 forms a feedback control system to maintain this attenuation ratio at the set value.

(S13) The controller 32 activates the inline amplifier unit 31a-2 and varies its gain in such a way that the output power level will be equivalent to that of a single wavelength signal.

This simply means that the inline amplifier unit 31a-2 is set to operate in constant output level mode (or ALC mode). Once the amplifier output level is settled, the operating mode of the inline amplifier unit 31a-2 is switched to constant gain mode (or AGC mode). Since the inline amplifier unit 31a-2 is receiving ASE light, its output also has a similar ASE spectrum. Later, at step S22, the post-amplifier unit 11a-3 shall receive signal light, instead of ASE light. The inline amplifier unit 31a-2 will then be able to output amplified signals at the same specified power level.

(S14) The controller 32 sends a downstream OSC message NORMOP=1 from its local OSC module 32a-1 to a remote OSC module 22a-2, thus notifying the transmission device 20 that ASE light is now available with a specified power level.

(S15) The controller 22 of the downstream transmission device 20 measures optical input power at the front end of the preamplifier unit 21a-2.

(S16) The VOA controller 22a-3 varies the attenuation ratio of its local VOA 21a-1 in such a way that the measured value of optical input power will meet the requirement of the preamplifier unit 21a-2. If this adjustment is finished successfully, the process advances to step S19.

(S17) If the preceding step S16 has failed to set the input power exactly to the desired level, it is then determined whether the best result of adjustment is within the required input dynamic range of the preamplifier unit 21a-2. If this condition is met, the process advances to step S19. If not, the process branches to step S18.

(S18) The controller 22 raises an alarm.

(S19) The controller 22 records the attenuation ratio of the VOA 21a-1 that was determined at steps S16 and S17, thus controlling the VOA 21a-1 to maintain that attenuation ratio.

(S20) The controller 22 activates the preamplifier unit 21a-2 and controls its gain such that the output power level will be equivalent to that of a single wavelength signal. This simply means that the preamplifier unit 21a-2 is set to operate in constant output level mode (or ALC mode). Once the amplifier output level is settled, the operating mode of the preamplifier unit 21a-2 is switched to constant gain mode (or AGC mode). Since at is receiving ASE light, the output of the preamplifier unit 21a-2 also has an ASE light spectrum. Later, at step S22, the post-amplifier unit 11a-3 will begin to provide signal light instead of ASE light. The preamplifier unit 21a-2 will then output amplified signals at the same specified power level.

(S21) The controller 22 sends an upstream OSC message ASEREQ=0 from its local OSC module 22b-1 to a remote OSC module 12b-2 via intermediate OSC modules 32b-2, 32b-1, and 12b-2. This ASEREQ=0 is to request the transmission device 10 to switch its post-amplifier from ASE mode to normal operation mode.

(S22) Upon receipt of ASEREQ=0, the controller 12 changes the operating mode of its local post-amplifier unit 11a-3 from ASE mode to normal operation mode. In normal operation mode, the post-amplifier unit 11a-3 is supposed to work at a predetermined gain, with its AGC functions activated. The controller 12 begins supplying input signals again to the post-amplifier by turning on the optical switch SW1 at its front end. The post-amplifier then amplifies incoming signals, if any, up to a specified level for delivery to downstream nodes.

(S23) The controller 12 sends an OSC message ASECOMP=1 from its local OSC module 12b-1 to a remote OSC module 32b-2. This ASECOMP=1 indicates that the transmission device 10 has successfully finished its startup process, and that optical signals are on the transmission line.

(S24) Upon receipt of the message ASECOMP=1, the controller 32 changes the operating mode of its local inline amplifier unit 31a-2 from AGC mode to normal operation mode with ALC or AGC.

(S25) The controller 32 sends a downstream OSC message ASECOMP=1 from its local OSC module 32a-1 to a remote OSC module 22a-2, thus notifying the transmission device 20 of the completion of its startup processing.

(S26) Upon receipt of the message ASECOMP=1, the controller 22 commands its local preamplifier unit 21a-2 to operate in normal operation mode with ALC or AGC.

Here are a couple of supplementary notes on how the loss of a VOA is kept constant. The first note is about the step of switching a post-amplifier from ASE mode to AGC mode in the case of protection transmission lines where no main signals are present normally. In the above-described startup process, a message ASEREQ=0 is sent at step S21, and the post-amplifier that has been sending ASE light is switched to AGC mode at step S22. That switching leads to a reduced gain of the post-amplifier of interest. The intensity of ASE light now decreases accordingly, and there are no main optical signal at all, but OSC signals from the preceding device keep the feedback control going. Specifically, the VOA 31a-1, for example, can maintain a constant attenuation ratio by using OSC signal power that the OSC module 12a-1 produces.

The second note is about the time constant of VOA control. The optical transmission system 1 of the present invention can be implemented as a ring network system, in which case the number of wavelengths may change abruptly (e.g., forty waves to one wave) as a result of path establishment operations of the system. This transitional change in the signal power level would cause an unexpected behavior of the VOA control loop if its response was too quick. The present invention avoids the problem by averaging the measurements of input power levels over a sufficiently long period and using the mean value to control the VOA of interest.

More specifically, a lowpass filter with a large time constant is inserted in the feedback control loop for a VOA. Take the VOA 31a-1, for example, and let T represent the time (in seconds) that signals take to pass through the variable attenuator VAT3. Input and output power levels monitored by photodiodes PD5 and PD6 are directed to the lowpass filter with a cutoff frequency of, for example, $1/(100 \times T)$ Hz. As such, the time constant of lowpass filters for this purpose is ten times to one hundred times greater than T.

The following few paragraphs will provide a summary of the tasks performed by each of the transmission devices 10 and 20 and repeater device 30, each distinct event or action being labeled with a step number. Note that upstream and downstream messages to/from those devices are carried by the supervisory control channels.

In the downstream optical transmission device 20, its internal controller 22 performs the following functions: initializing a downstream-device VOA (S2); sending an upstream message to request a preceding device to emit optical noise (S3); receiving a downstream message from the preceding device that reports successful emission of optical noise (S14); measuring optical input power that the local preamplifier unit is receiving (S15); controlling the downstream-device VOA to maintain a constant loss, so that the measured value of the optical input power will be equal to a target level that the preamplifier unit requires (S17, S19); determining the gain of the preamplifier unit in ALC mode and switching the preamplifier unit to operate in AGC mode (S20); sending an upstream message to request the preceding device to stop the emission of optical noise (S21); receiving a downstream message indicating the completion of startup processing at the preceding device (S25); and setting the preamplifier unit to operate in normal operation mode (S26).

In the repeater device 30, its internal controller 32 performs the following functions: receiving an upstream message that requests emission of optical noise (S3) initializing a repeater-device VOA (S4); forwarding the noise emission request message upstream (S5); receiving a downstream message from the upstream device that reports successful emission of optical noise (S7); measuring optical input power that the local inline amplifier is receiving (S8); controlling the repeater-device VOA to maintain a constant loss, so that the measured value of the optical input power will be equal to a target level that the inline amplifier requires (S10, S12); determining the gain of the inline amplifier unit in ALC mode and switching the inline amplifier unit to operate in AGC mode (S13); sending a downstream message to indicate terminated emission of optical noise (S14); receiving an upstream message that indicates terminated emission of the optical noise (S21); forwarding the emission termination message upstream (S21); receiving a message from the upstream device that indicates completion of startup processing (S23); setting the inline amplifier unit to operate in normal operation mode (S24); and sending a downstream message that indicates completion of automatic startup of the repeater device itself (S25).

In the upstream optical transmission device 10, its internal controller 12 performs the following functions: receiving an upstream message that requests emission of optical noise (S5); setting a post-amplifier unit to operate in noise emission mode and blocking its input to the post-amplifier by turning off an optical switch disposed before the post-amplifier unit (S6); sending a downstream message to indicate emission of optical noise that has been requested (S7); receiving an upstream message that requests to stop emission of optical noise (S21); setting the post-amplifier unit to operate in normal operation mode and resuming input to the post-amplifier unit by turning on the optical switch (S22); and sending a downstream message to indicate completion of startup processing of the upstream optical transmission device itself (S23).

This section has presented an automatic startup process triggered by insertion of a preamplifier unit 21a-2 or recovery of its input signals, as an example of the functions provided by the present invention. It should be appreciated that a similar process will be initiated by insertion of an inline amplifier unit 31a-2 or recovery of its input signals.

As seen from the above, the optical transmission system 1 brings itself into operational condition by using ASE light from optical amplifiers (or alternatively, supervisory control signals) as optical input signals for attenuator adjustment. The present invention provides automatic startup functions as a system-level solution, rather than as a feature of individual optical attenuators or preamplifiers. The startup process involves communication between nodes in a large WDM system, thus enabling highly efficient and accurate setup of optical devices in those nodes.

Second Embodiment

Figure 9:
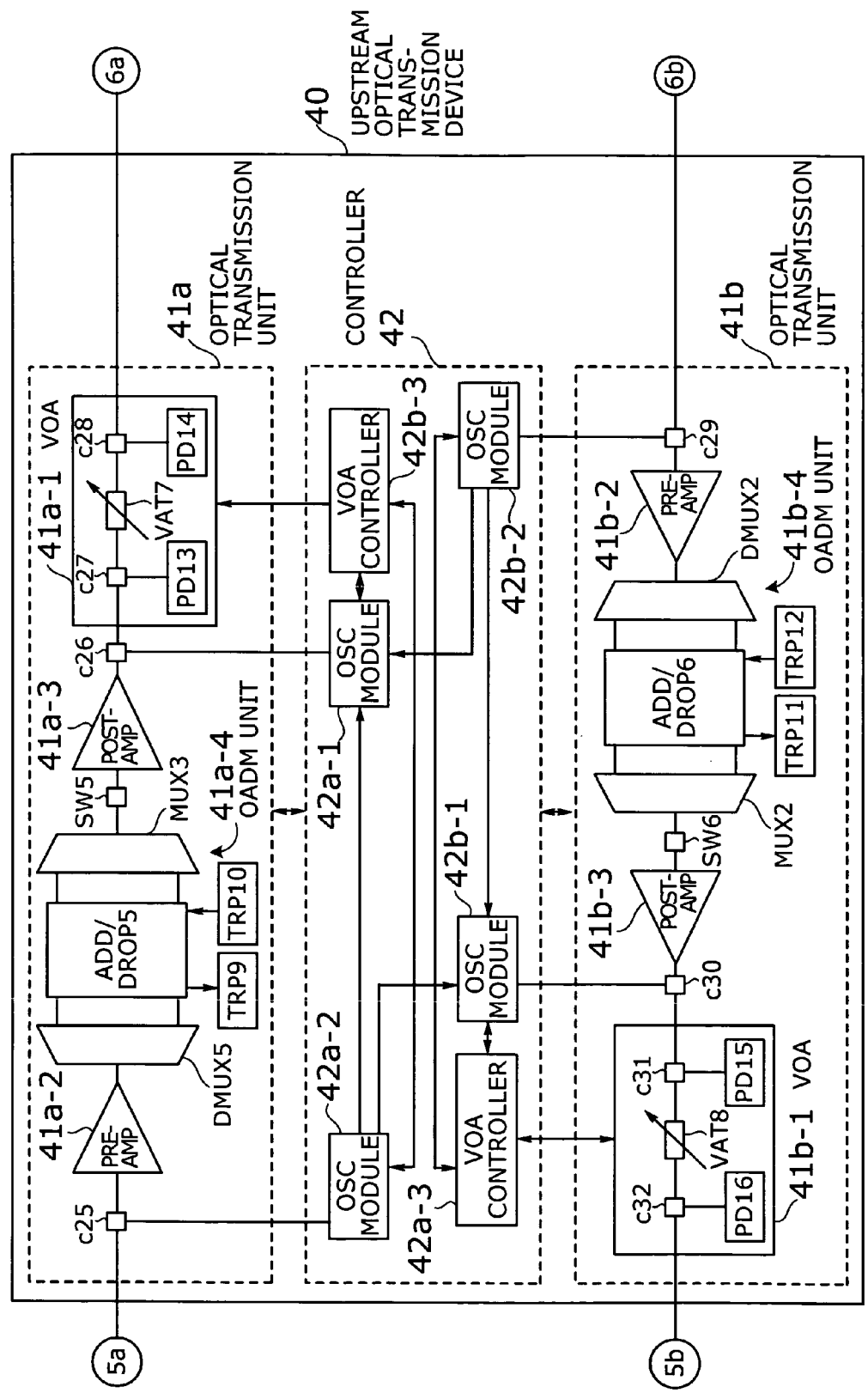
FIGS. 9 to 11 show the structure of an optical transmission system according to a second embodiment of the present invention.
Figure 10:
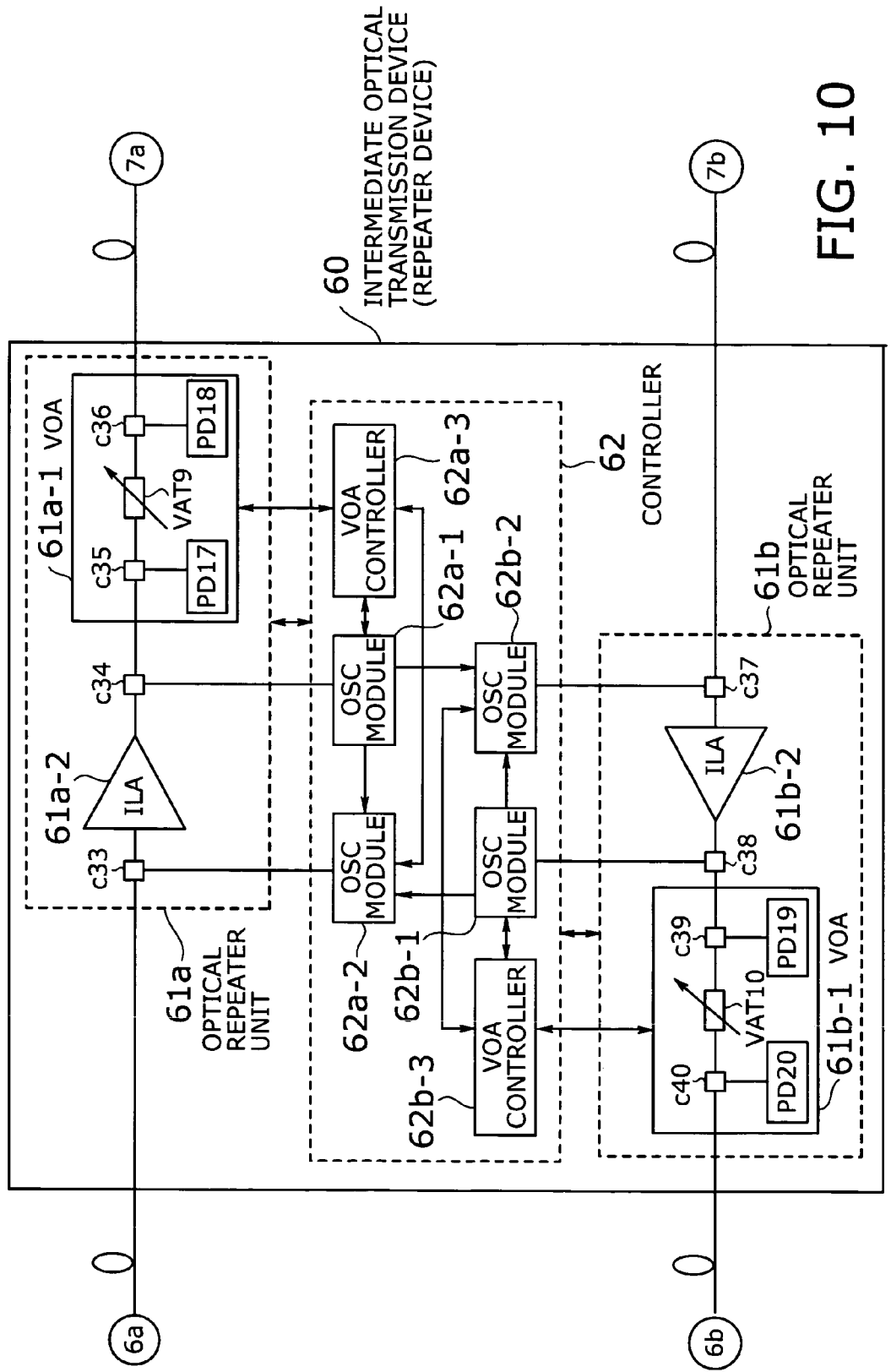
Figure 11:
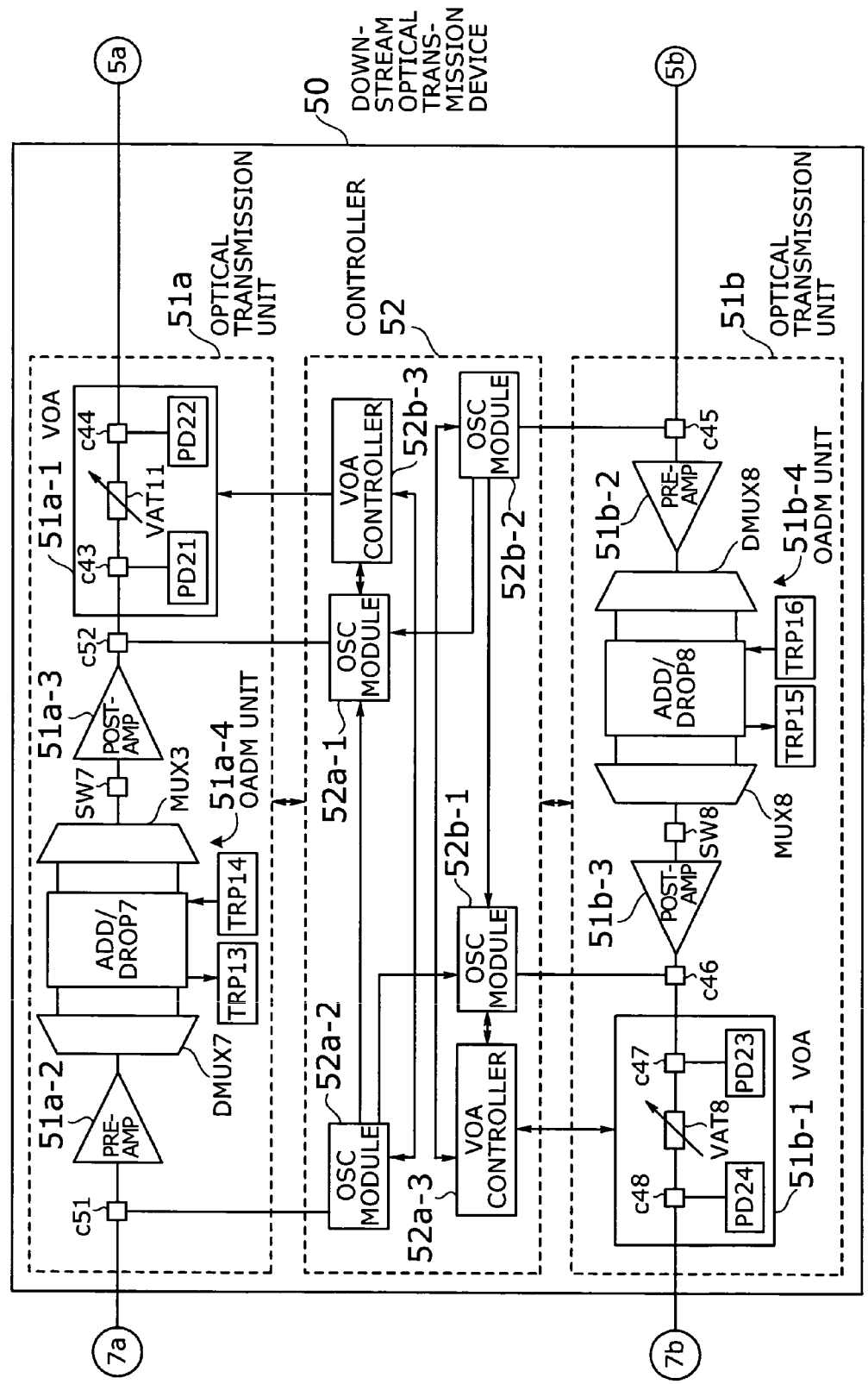

In this section, we will describe an automatic startup process according to a second embodiment of the present invention, in which a VOA is attached to the output stage of each optical amplifier. FIGS. 9 to 11 show the structure of an optical transmission system 2 according to the second embodiment. Specifically, FIG. 9 is a block diagram of an upstream optical transmission device 40 (referred to as "transmission device 40" where appropriate). FIG. 10 is a block diagram of an intermediate optical transmission device 60 (referred to as "repeater device 60" where appropriate). FIG. 11 is a block diagram of a downstream optical transmission device 50 (referred to as "transmission device 50" where appropriate).

Unlike the first embodiment, the optical transmission system 2 employs a VOA at the output stage of (as opposed to at the front end of) each post-amplifier, inline amplifier, and preamplifier. In addition, the automatic startup process of this system 2 is designed not to violate prescribed upper limits of transmitter power, thus avoiding adverse effects of non-linearity of optical fiber used.

Referring to FIG. 9, the transmission device 40 has two optical transmission units 41a and 41b and a controller 42. The optical transmission unit 41a includes a VOA 41a-1, a preamplifier unit 41a-2, a post-amplifier unit 41a-3, and an OADM unit 41a-4, where the post-amplifier unit 41a-3 is composed of an optical switch SW5 and an optical post-amplifier. Also included in the optical transmission unit 41a are couplers c25 to c28. The VOA 41a-1 has, among others, photodiodes PD13 and PD14 and a variable attenuator VAT7. This VOA 41a-1 is placed at the output stage of the post-amplifier unit 41a-3. The OADM unit 41a-4 has a demultiplexer DMUX5, an add/drop unit ADD/DROP5, a multiplexer MUX5, and transponders TRP9 and TRP10.

The optical transmission unit 41b includes a VOA 41b-1, a preamplifier unit 41b-2, a post-amplifier unit 41b-3, and an OADM unit 41b-4, where the post-amplifier unit 41b-3 is composed of an optical switch SW6 and an optical post-amplifier. Also included in the optical transmission unit 41b are couplers c29 to c32. The VOA 41b-1 has, among others, photodiodes PD15 and PD16 and a variable attenuator VAT7. This VOA 41a-1 is placed at the output stage of the post-amplifier unit 41a-3. The OADM unit 41b-4 has a demultiplexer DMUX6, an add/drop unit ADD/DROP6, a multiplexer MUX6, and two transponders TRP11 and TRP12.

The controller 42 has OSC modules 42a-1, 42a-2, 42b-1, and 42b-2 to control OSC signal transmission. Also included in the controller 42 are VOA controllers 42a-3 and 42b-3 that control two VOAs 41a-1 and 41b-1, respectively.

Referring to FIG. 10, the repeater device 60 has two optical repeater units 61a and 61b and a controller 62. The optical repeater unit 61a has, among others, a VOA 61a-1 and an inline amplifier unit 61a-2, which include couplers c33 to c36. The VOA 61a-1 has, among others, photodiodes PD17 and PD18 and a variable attenuator VAT9. This VOA 61a-1 is placed at the output stage of the inline amplifier unit 61a-2.

The optical repeater unit 61b has, among others, a VOA 61b-1 and an inline amplifier unit 61b-2, which include couplers c37 to c40. The VOA 61b-1 has, among others, photodiodes PD19 and PD20 and a variable attenuator VAT10. This VOA 61b-1 is placed at the output stage of the inline amplifier unit 61b-2.

The controller 62 has OSC modules 62a-1, 62a-2, 62b-1, and 62b-2 to control OSC signal transmission. Also included in the controller 62 are VOA controllers 62a-3 and 62b-3 that control two VOAs 61a-1 and 61b-1, respectively.

Referring to FIG. 11, the transmission device 50 has two optical transmission units 51a and 51b and a controller 52. The optical transmission unit 51a includes a VOA 51a-1, a preamplifier unit 51a-2, a post-amplifier unit 51a-3, and an OADM unit 51a-4, where the post-amplifier unit 51a-3 is composed of an optical switch SW7 and an optical post-amplifier. Also included in the optical transmission unit 51a are couplers c41 to c44. The VOA 51a-1 has, among others, photodiodes PD21 and PD22 and a variable attenuator VAT11. This VOA 51a-1 is placed at the output stage of the post-amplifier unit 51a-3. The OADM unit 51a-4 has a demultiplexer DMUX7, an add/drop unit ADD/DROP7, a multiplexer MUX7, and two transponders TRP13 and TRP14.

The optical transmission unit 51b includes a VOA 51b-1, a preamplifier unit 51b-2, a post-amplifier unit 51b-3, and an OADM unit 51b-4, where the post-amplifier unit 51b-3 is composed of an optical switch SW8 and an optical post-amplifier. Also included in the optical transmission unit 51b are couplers c45 to c48. The VOA 51b-1 has, among others, photodiodes PD23 and PD24 and a variable attenuator VAT12. This VOA 51b-1 is placed at the output stage of the post-amplifier unit 51b-3. The OADM unit 51b-4 has a demultiplexer DMUX8, an add/drop unit ADD/DROP8, a multiplexer MUX8, and two transponders TRP15 and TRP16.

The controller 52 has OSC modules 52a-1, 52a-2, 52b-1, and 52b-2 to control OSC signal transmission. Also included in the controller 52 are VOA controllers 52a-3 and 52b-3 that control two VOAs 51a-1 and 51b-1, respectively.

Figure 12:
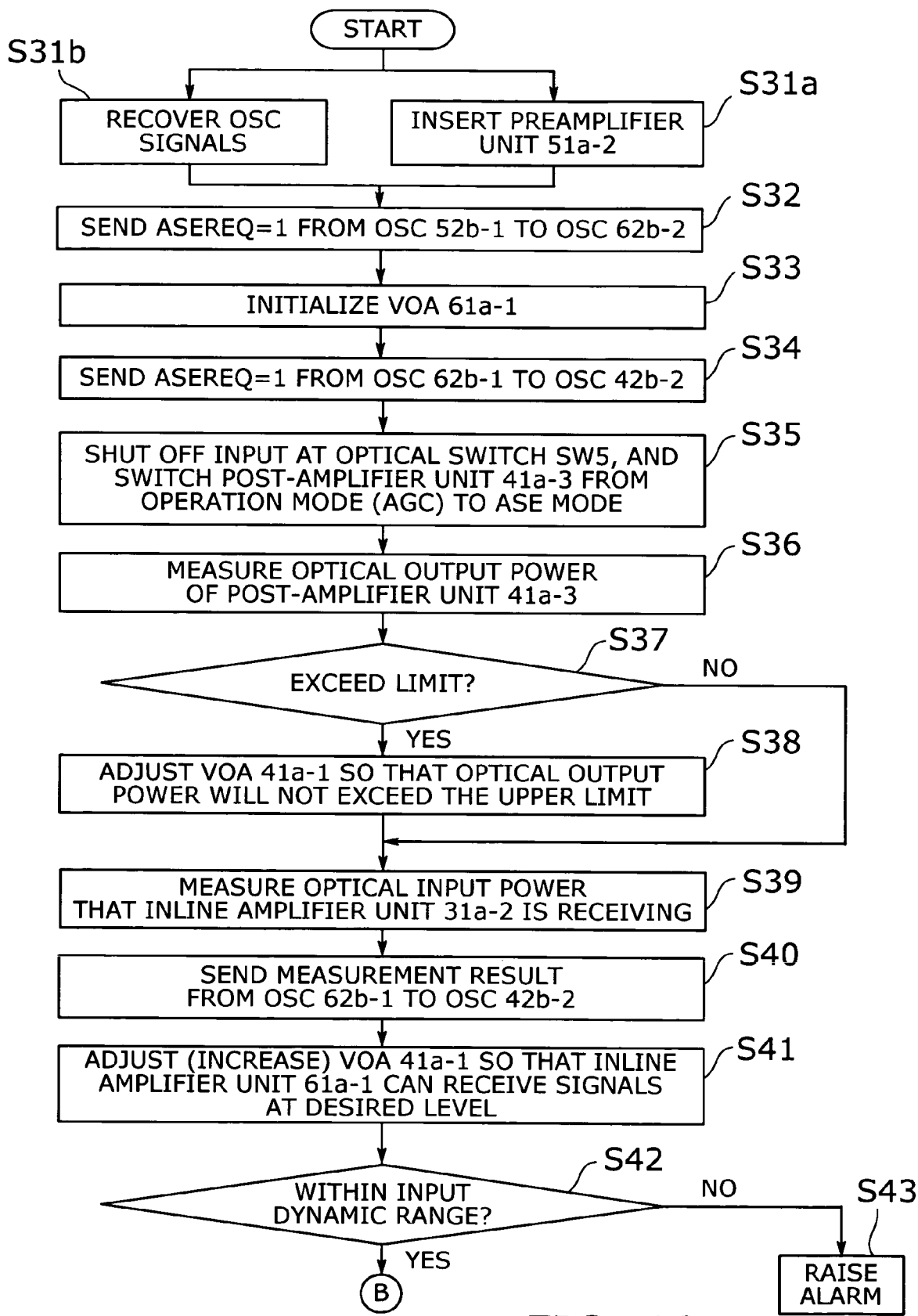
FIGS. 12 to 14 show a flowchart of an automatic startup process according to the second embodiment of the invention.
Figure 13:
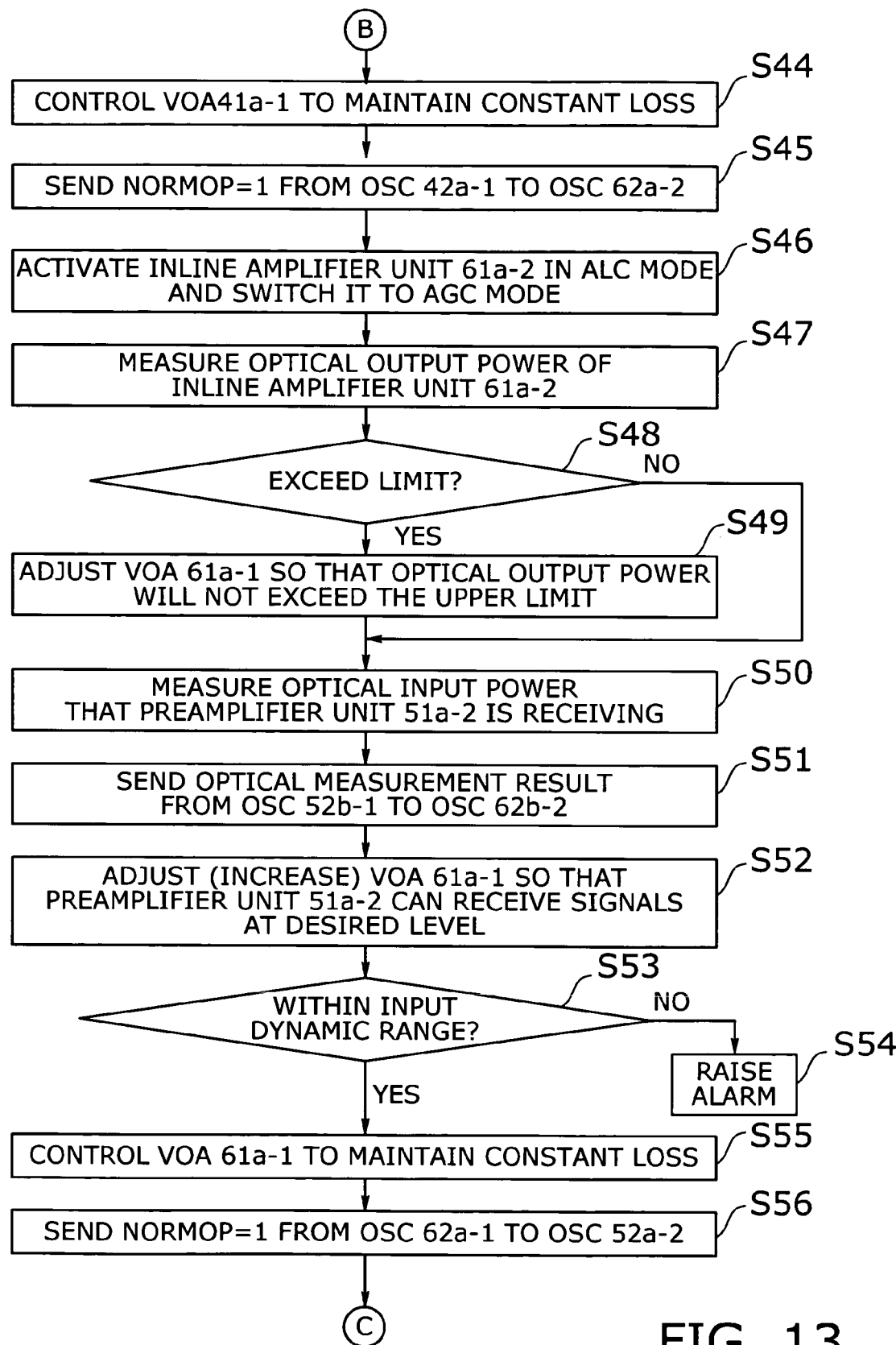
Figure 14:
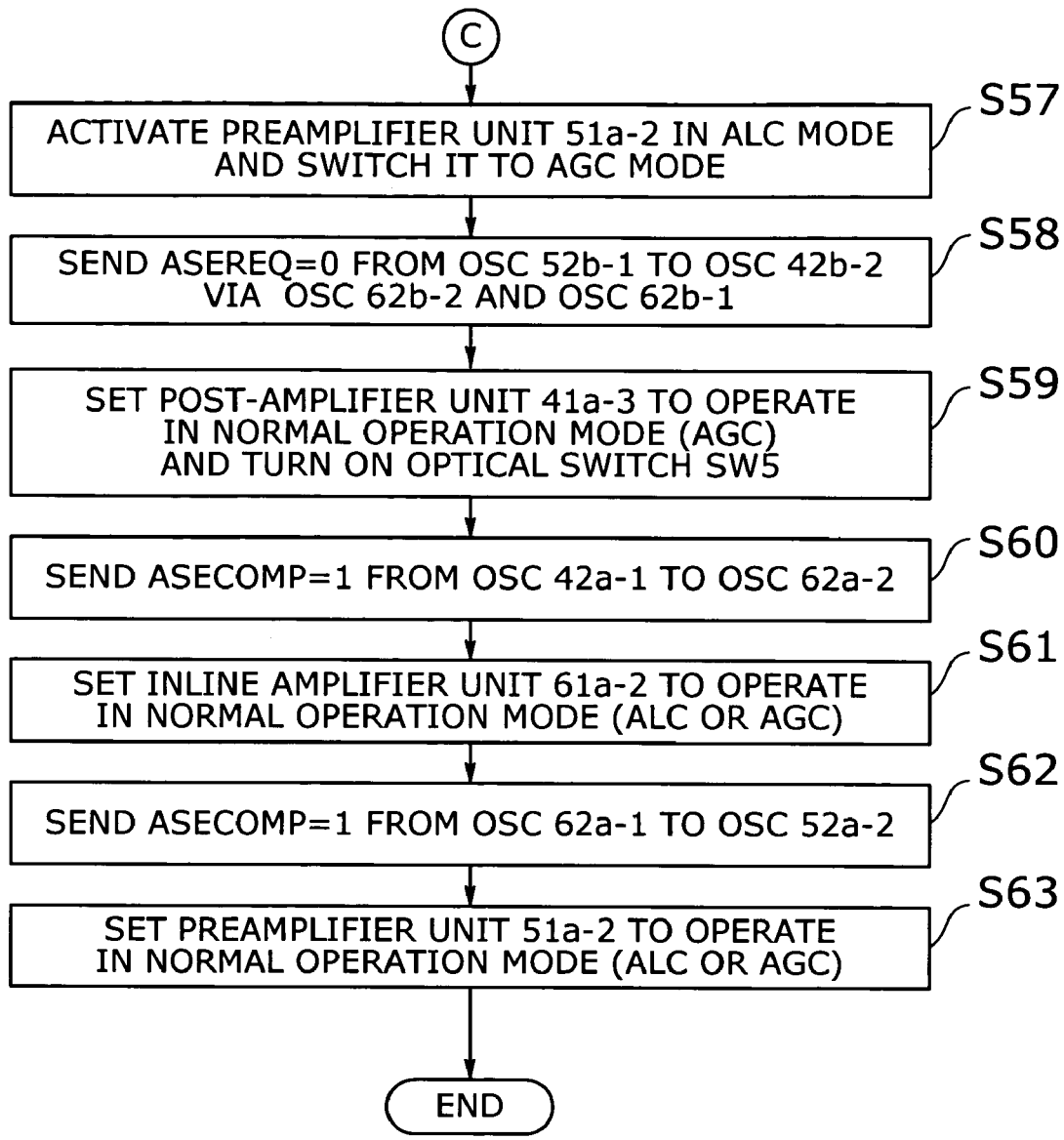
Figure 15:
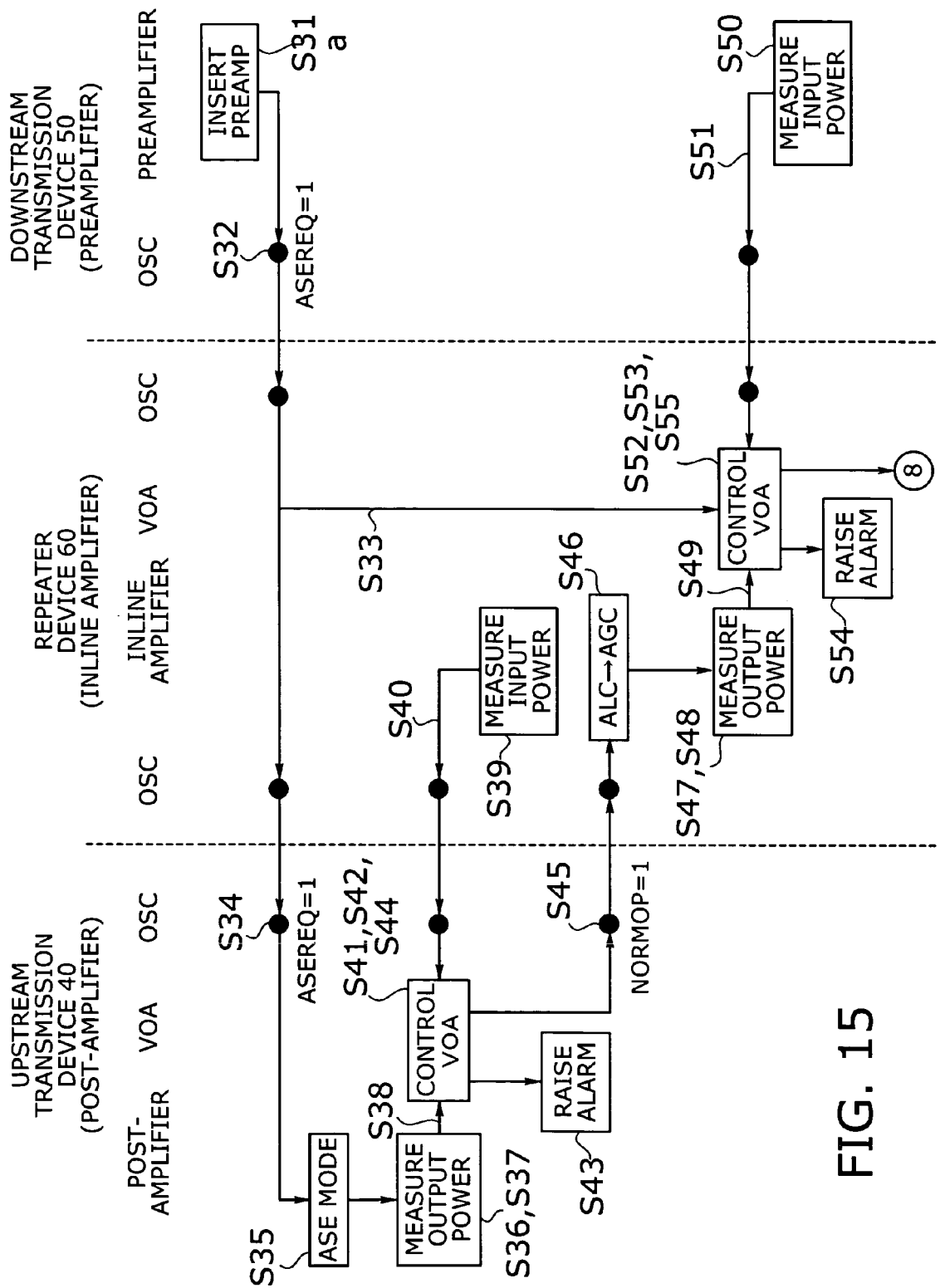
FIGS. 15 and 16 show a state transition diagram of the automatic startup process according to the second embodiment of the invention.
Figure 16:
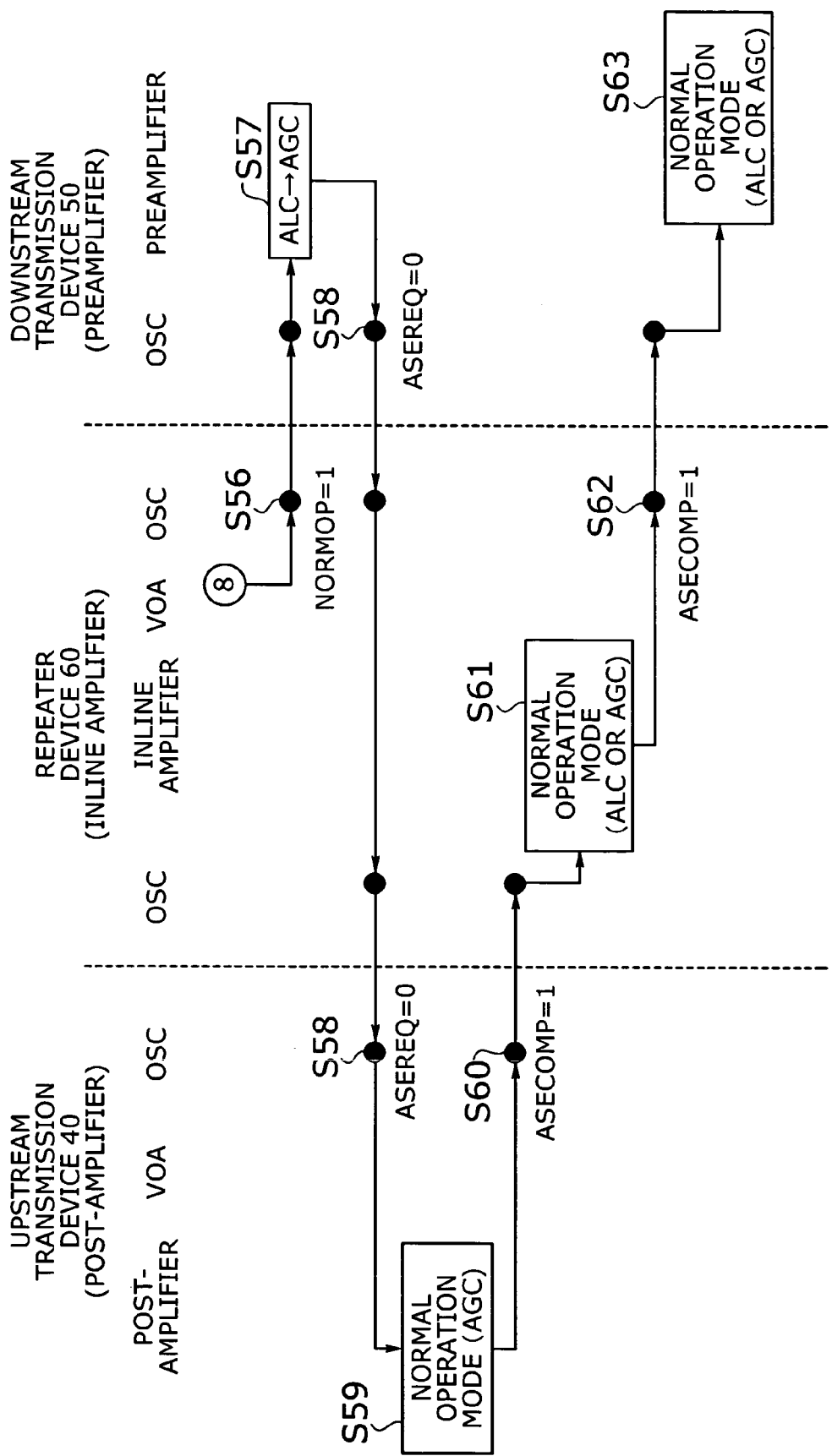

Referring now to FIGS. 12 to 16, we will now describe in detail the automatic startup process of the optical transmission system 2 of FIGS. 9 to 11. FIGS. 12 to 14 show a flowchart of an automatic startup process according to the first embodiment of the invention, and FIGS. 15 and 16 present a state transition diagram of the same. The step numbers in the flowchart are consistent with those in the state transition diagram. The process goes as follows:

(S31a) A service engineer inserts a preamplifier unit 51a-2 to the transmission device 50. This event triggers the controller 52 to execute startup processing.

(S31b) With the presence of OSC signals coming from a remote OSC module 62a-1, the OSC module 52a-2 finds it as a trigger to an automatic startup process.

(S32) Triggered by the event at step S31a or S31b, the controller 52 sends an OSC message ASEREQ=1 from its local OSC module 52b-1 to a remote OSC module 62b-2.

(S33) The receiving VOA controller 62a-3 initializes its local VOA 61a-1 to a predetermined attenuation level.

(S34) The controller 62 sends an OSC message ASEREQ=1 from its local OSC module 62b-1 to a remote OSC module 42b-2. This ASEREQ=1 requests emission of ASE light.

(S35) The controller 42 receives the message ASEREQ=1. The post-amplifier unit 41a-3 shuts off its input at the optical switch SW5, thus beginning to operate in ASE mode, as opposed to AGC mode. The post-amplifier unit 41a-3 produces ASE light with a power level equivalent to a single wavelength signal.

(S36) The controller 42 of the transmission device 40 measures the optical output power that the post-amplifier unit 41a-3 is producing.

(S37) It is determined whether the measured value exceeds a specified tolerance level. If so, the process advances to step S38. If not, then the process skips to step S39.

It is desired, in some cases, to limit the power of signals in an optical transmission line below a certain level. This is to avoid non-linear effects known as the four wave mixing (FWM), which may become more prominent with some types of fiber media. To meet such requirements, the system of the present invention is designed to start up itself while keeping the power of transmission signals below a predetermined upper limit. This feature eliminates the need for preparing a plurality of post-amplifier cards for selection. In the present step, the limitation applies to the optical power to be entered into the downstream line carrying signals from the transmission device 40 to the repeater device 60.

(S38) The VOA controller 42a-3 adjusts its local VOA 41a-1 so that the optical output power of the post-amplifier unit 41a-3 will fall within a given tolerance range.

(S39) Via an OSC module 62a-2, the controller 62 of the repeater device 60 measures the optical power that the inline amplifier unit 61a-2 is receiving.

(S40) The controller 62 sends an OSC message containing the measurement result of step S39, from its local OSC module 62b-1 to a remote OSC module 42b-2.

(S41) The VOA controller 42a-3 varies (increases, actually) the attenuation ratio of its local VOA 41a-1 in such a way that the measurement value of optical input power will agree with the target power level that the inline amplifier unit 61a-2 requires.

(S42) In the case the preceding step S41 has failed to set the input power exactly to the desired level, it is then determined the best result of adjustment is within the required input dynamic range of the inline amplifier unit 61a-2. If this condition is met, the process advances to step S44. If not, the process branches to step S43. It is not allowed, however, for the optical input power to exceed the output tolerance level mentioned at step S37.

(S43) The controller 42 raises an alarm.

(S44) The controller 42 records the attenuation ratio of the VOA 41a-1 that was determined at steps S41 and S42, thus continuing control of the VOA 41a-1 to maintain that attenuation ratio.

(S45) The controller 42 sends an OSC message NOR-MOP=1 from its local OSC module 42a-1 to a remote OSC module 62a-2, thus notifying the repeater device 60 that ASE light is now available.

(S46) The controller 62 activates its local inline amplifier unit 61a-2 in ALC mode, at an output power level equivalent to a single wavelength signal. After waiting for the output level to settle, the controller 62 sets the inline amplifier unit 61a-2 to AGC mode.

(S47) Via an OSC module 62a-1, the controller 62 measures the optical output power that the inline amplifier unit 61a-2 is producing.

(S48) The controller 62 determines whether the measured value exceeds a specified tolerance level, as in step S37. If it exceeds, the process advances to step S49. If not, then the process skips to step S50. In the present step, the limitation applies to the optical power to be entered into the downstream line carrying signals from the repeater device 60 to the transmission device 50.

(S49) The VOA controller 62a-3 adjusts its local VOA 61a-1 so that the optical output power of the inline amplifier unit 61a-2 will fall within a given tolerance range.

(S50) Via an OSC module 52a-2, the controller 52 of the transmission device 50 measures the optical power that the preamplifier unit 51a-2 is receiving.

(S51) The controller 52 sends an OSC message containing the measurement result of step S50, from its local OSC module 52b-1 to a remote OSC module 62b-2.

(S52) The VOA controller 62a-3 varies the attenuation ratio of its local VOA 61a-1 in such a way that the measurement value of optical input power will agree with the target power level that the preamplifier unit 51a-2 requires.

(S53) In the case the preceding step S52 has failed to set the input power exactly to the desired level, it is determined the best result of adjustment is within the required input dynamic range of the preamplifier unit 51a-2. If this condition is met, the process advances to step S55. If not, the process branches to step S54.

(S54) The controller 62 raises an alarm.

(S55) The controller 62 records the attenuation ratio of the VOA 61a-1 that was determined at steps S52 and S53, thus controlling the VOA 61a-1 to maintain that attenuation ratio.

(S56) The controller 62 sends an OSC message NOR-MOP=1 from its local OSC module 62a-1 to a remote OSC module 52a-2, thus notifying the transmission device 50 that ASE light is now available.

(S57) The preamplifier unit 51a-2 is activated in ASE mode, producing ASE light with an intensity equivalent to a single wavelength signal.

(S58) The controller 52 sends an OSC message ASEREQ=0 from its local OSC module 52b-1 to a remote OSC module 42b-2 via intermediate OSC modules 62b-2, 62b-1, and 42b-2. This ASEREQ=0 is to request the sending transmission device 40 to stop emitting ASE light.

(S59) Upon arrival of the message ASEREQ=0 at the controller 42, the post-amplifier unit 41a-3 moves into normal operation mode (AGC mode) with its set gain, where the optical switch SW5 is turned on to accept incoming signals.

(S60) The controller 42 sends an OSC message ASEC-OMP=1 from its local OSC module 42a-1 to a remote OSC module 62a-2, thus notifying the repeater device 60 of the completion of its startup process.

(S61) Upon receipt of the message ASECOMP=1, the controller 62 sets the inline amplifier unit 61a-2 to operate in normal operation mode with ALC or AGC.

(S62) The controller 62 sends an OSC message ASEC-OMP=1 from its local OSC module 62a-1 to a remote OSC module 52a-2, thus notifying the transmission device 50 of the completion of the startup process.

(S63) Upon receipt of the message ASECOMP=1, the controller 52 sets the preamplifier unit 51a-2 to normal operation mode by activating ALC or AGC.

The second embodiment is similar to the first embodiment described earlier in terms of how it controls a VOA to maintain a constant loss or how its time constant is determined. When there are no add-channel signals, the system of the second embodiment uses, for example, OSC signals from an OSC module 42a-1 as input power for a VOA 41a-1 in keeping its loss constant.

The following few paragraphs provide a summary of operation in each of the transmission devices 40 and 50 and repeater device 60, each distinct event or action being labeled with a step number. Note that upstream and downstream messages to/from those devices are carried by the supervisory control channels.

In the downstream optical transmission device 50, its internal controller 52 performs the following functions: sending an upstream message to request the preceding device to emit optical noise (S32); measuring optical input power that a preamplifier unit is receiving (S50); sending an upstream message containing the measurement result (S51); receiving a downstream message that reports successful emission of optical noise (S56); determining the gain of the preamplifier unit in ALC mode and switching the preamplifier unit to operate in AGC mode (S57); sending an upstream message requesting to stop the emission of optical noise (S58); receiving a downstream message indicating the completion of startup processing at the preceding device (S62); and setting the preamplifier unit to operate in normal operation mode (S63).

In the repeater device 60, its internal controller 62 performs the following functions: receiving an upstream message that requests emission of optical noise (S32); initializing a repeater-device VOA (S33); forwarding upstream the noise emission request message (S34); measuring optical input power that the inline amplifier is receiving (S39); sending an upstream message containing the measurement result (S40); receiving a downstream message from the upstream device that reports successful emission of optical noise (S45); determining the gain of the inline amplifier unit in ALC mode and switching the inline amplifier unit to operate in AGC mode (S46); measuring optical output power that the inline amplifier is producing (S47, S48); receiving an upstream message that contains the result of optical power measurement performed at the downstream device (S51); varying the attenuation level of the repeater-device VOA, so that the measured optical output power will not exceed a given limit (S52, S53); controlling the repeater-device VOA to maintain a constant loss, so that the measured value of received optical power will be equal to a target level that the preamplifier unit in the downstream device requires (S55); forwarding an upstream message that requests to stop the emission of optical noise (S58); receiving a downstream message that indicates completion of startup processing at the upstream device (S60); setting the inline amplifier unit to operate in normal operation mode (S61); and sending a downstream message reporting the completion of startup processing at the repeater device itself (S62).

In the upstream optical transmission device 40, its internal controller 42 performs the following functions: receiving an upstream message that requests emission of optical noise (S34); blocking input to a post-amplifier by turning off an optical switch disposed at its front end, thus setting the post-amplifier unit to operate in noise emission mode (S35); measuring optical output power that the post-amplifier is producing (S36, S37); varying the attenuation level of the upstream-device VOA, so that the measured value will not exceed a given limit (S38); receiving an upstream message that contains the result of optical power measurement performed at the downstream device (S40); controlling the upstream-device VOA to maintain a constant loss, so that the measured optical power value will be equal to a target level that the inline amplifier unit in the downstream device requires (S41, S42, S44); sending a downstream message to indicate emission of optical noise (S45); receiving an upstream message that requests to stop the emission of optical noise (S58); setting the post-amplifier unit to operate in normal operation mode (S59); and sending a downstream message to notify the downstream device of the completion of startup processing (S60).

Third Embodiment

This section describes a system with automatic startup functions according to a third embodiment of the present invention. The third embodiment differs from the preceding two embodiments in that the transmission line loss of each section between nodes is calculated for use in startup processing that follows. The system of the third embodiment has the same structure as what we have described in FIGS. 2 to 4, except that the optical switch placed before every post-amplifier can be eliminated.

Figure 17:
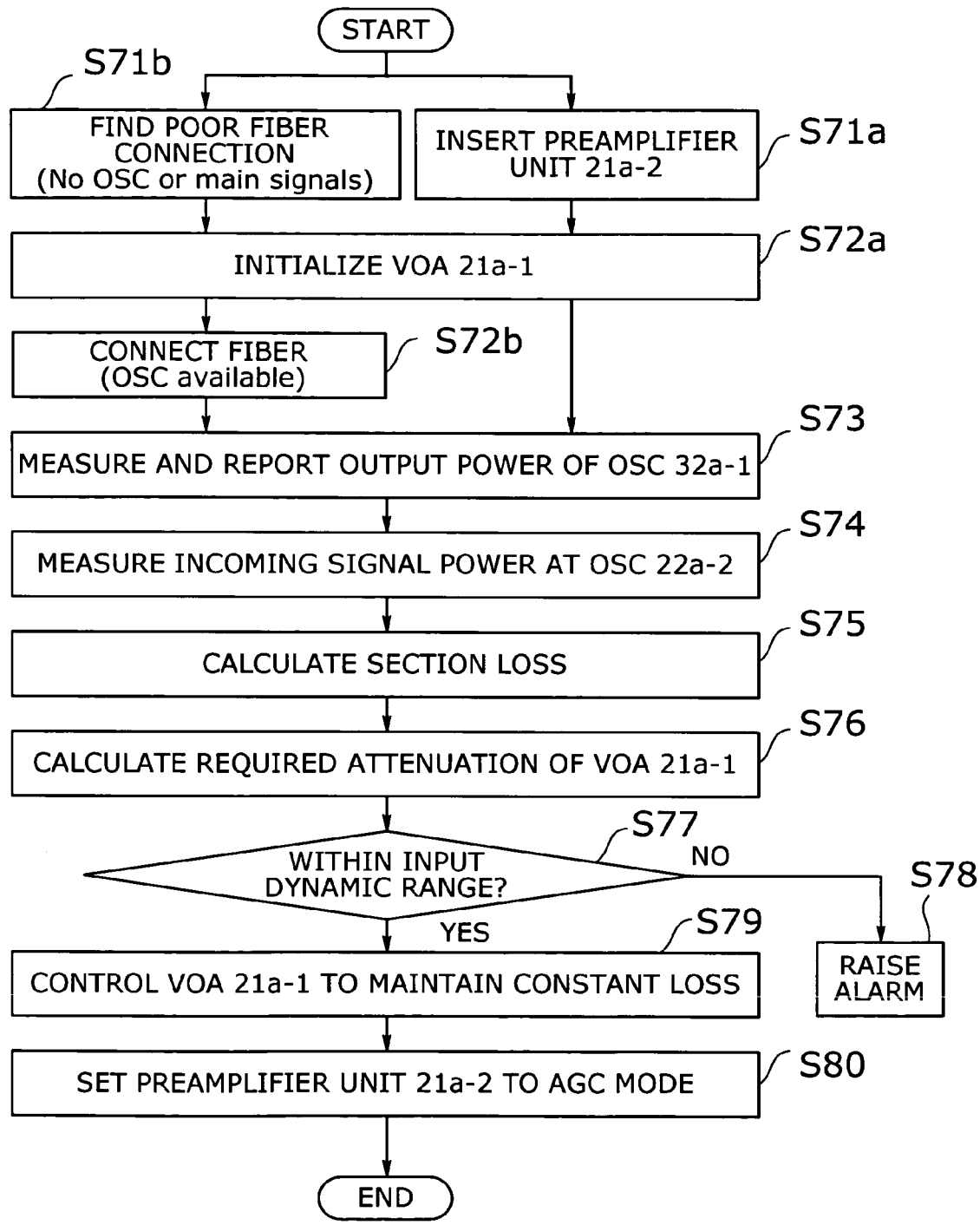
FIG. 17 is a flowchart of an automatic startup process according to a third embodiment of the invention.
Figure 18:
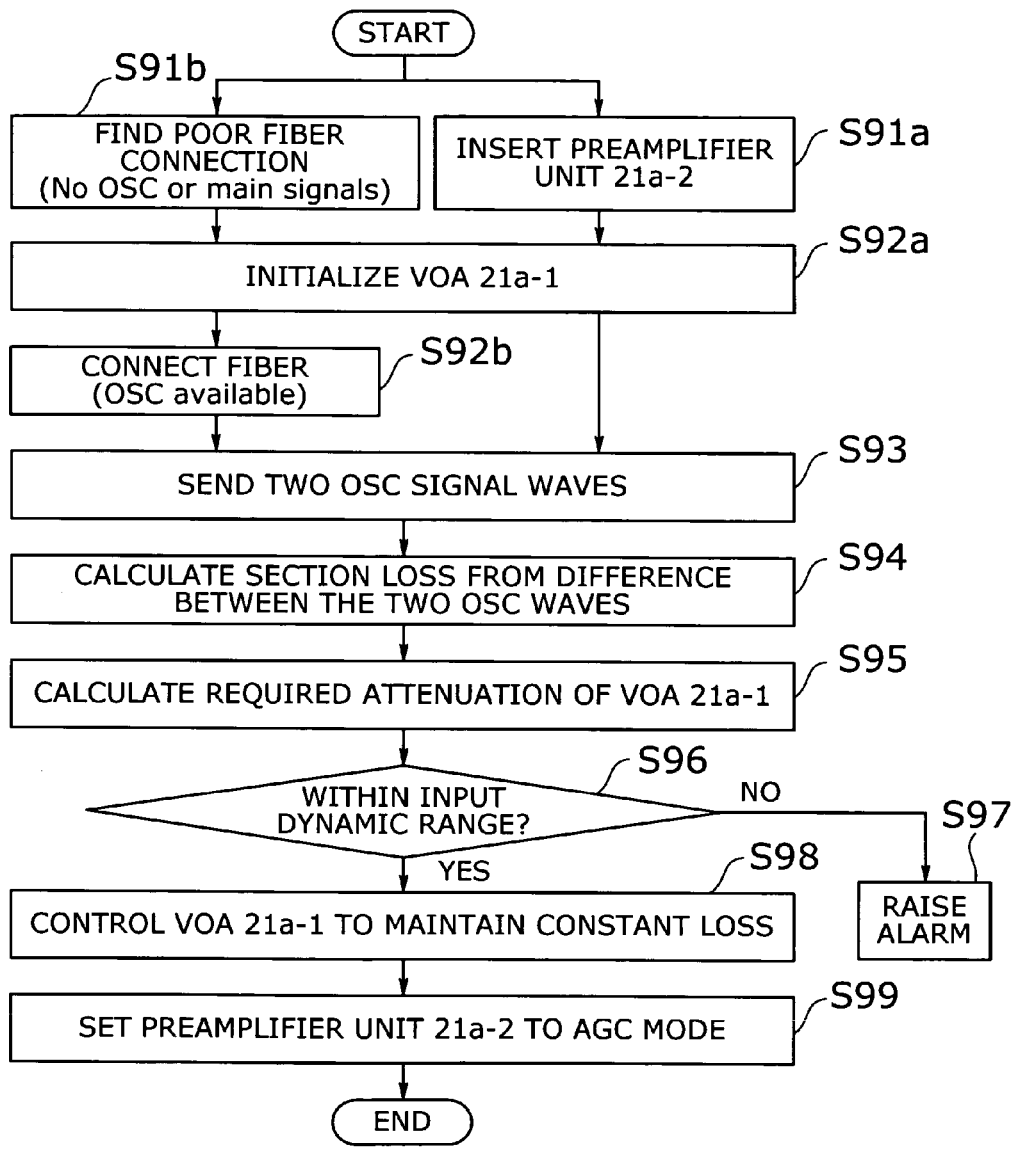
FIG. 18 is a flowchart of an automatic startup process according to a fourth embodiment of the invention.

FIG. 17 is a flowchart of an automatic startup process according to the third embodiment of the invention. This process goes as follows:

(S71a) A service engineer inserts a preamplifier unit 21a-2 to the transmission device 20. This event triggers the controller 22 to begin startup processing. Note that OSC signals have to be available at this stage.

(S71b) The controller 22 examines whether OSC signals and main signals are available on the receiving transmission line. This test reveals poor fiber connection, if any.

(S72a) The event at step S71a or step S71b causes the controller 22 to execute the following: Upon insertion of a preamplifier unit 21a-2 at step S71a, the VOA controller 22a-3 immediately initializes the corresponding VOA 21a-1 to a predetermined attenuation level, permitting an OSC module 22a-2 to receive a sufficient amount of optical input power. The process then advances to step S73. Or, upon detection of poor fiber connection at step S71b, the VOA controller 22a-3 initializes the VOA 21a-1 in the same way as in the former case, before the process advances to step S72b.

(S72b) With the presence of OSC signals coming from a remote OSC module 32a-1, the OSC module 22a-2 finds it as a trigger to an automatic startup process. More specifically, the controller 22 is designed to detect poor fiber connection when neither main optical signals nor OSC signals are found. The controller 22 interprets in turn the presence of OSC signals as a sign of recovery from a fiber-related problem. It therefore invokes a startup process (or restart process) upon detection of OSC signals, whether main optical signals are available or not.

(S73) The OSC module 32a-1 measures the output power of OSC signals at point (a) in FIG. 3. This measured value is sent downstream to the transmission device 20 in the form of an OSC message.

(S74) In the transmission device 20, the OSC module 22a-2 measures the incoming power a t point (e) in FIG. 4. The result indicates the current input power level of the preamplifier unit 21a-2.

(S75) The controller 22 calculates section loss of main optical signals between the output of the inline amplifier unit 31a-2 and the input of the preamplifier unit 21a-2. This section loss denotes the amount of main signal loss between point (b) and point (f).

(S76) Based on the output power level (design value) of the inline amplifier unit 31a-2 and the section loss calculated at step S75, the VOA controller 22a-3 calculates an expected input power level of the preamplifier unit 21a-2. If the estimate is agreeable to the desired input level of the preamplifier unit 21a-2, then the VOA controller 22a-3 calculates how much attenuation should be set to the VOA 21a-1 to achieve the purpose. The above design value of output power may be stored in the OSC module 32a-2 and supplied to the VOA controller 22a-3 in the form of an OSC message.

(S77) When it is hard to set the input power exactly to the desired level, the controller 22 then determines whether the best possible adjustment can bring it within the input dynamic range of the preamplifier unit 21a-2. If such adjustment is possible, the process advances to step S79. If not, the process branches to step S78.

(S78) The controller 22 raises an alarm.

(S79) The controller 22 records the attenuation ratio of the VOA 21a-1 determined at steps S76 and S77, thus controlling the VOA 21a-1 to maintain that attenuation ratio.

(S80) The controller 22 activates its local preamplifier unit 21a-2 in AGC mode with a gain calculated from the estimated preamplifier input and required output power level. The controller 22 may then receive an incoming OSC message indicating transmission of main signals. In that case, the downstream device controller 22 sets the preamplifier unit 21a-2 to operate in ALC mode with an appropriate output power level according to the number of incoming wavelengths. The post-amplifier unit 21a-3, on the other hand, operates in normal operation mode with AGC functions enabled.

At step S75, the downstream device controller 22 uses the following formula (1) to calculate section loss, namely the loss of a section between points (b) and (f).

$$(L1s + L2s) + \frac{Pa - Pe - (L1o + L2o) - L3}{LcOSC \times Lcs} + L3 \qquad (1)$$

Pa and Pe are OSC signal power levels measured at points (a) and (e), respectively. L1o and L1s represent multiplexing filter losses of a coupler c12 in OSC signal band and main signal band, respectively. L2o and L2s represent demultiplexing filter losses of another coupler c19 in OSC signal band and main signal band, respectively. L3 represents loss of the VOA 21a-1. LcOSC and Lcs are transmission loss coefficients (dB/km) in OSC signal band and main signal band, respectively. Those parameters are known to the controller 22, except for Pa and Pe.

As can be seen from the above, the third embodiment of the present invention makes good use of OSC signals that are available on each link between network devices. That is, the section loss of main optical signals is estimated from OSC output power level at an upstream device and OSC input power level at a downstream device, according to formula (1). Then, a required attenuation level of a downstream-device VOA is determined on the basis of the upstream amplifier's output power level (design value) and the section loss calculated above. The post-amplifier and preamplifier are then switched to appropriate operating mode. This feature of the present embodiment permits VOAs and optical amplifiers to start up automatically and effectively. Since it uses OSC signals, rather than ASE light, the proposed startup techniques will also work in a system with no upstream post-amplifiers.

The flowchart of FIG. 17 has only shown the interaction between the transmission device 20 and repeater device 30. However, the same concept and procedure can be applied to the other transmission device 10 and its interaction with the repeater device 30. Specifically, the section loss between the transmission device 10 and repeater device 30 is calculated first, which enables the VOA and optical amplifier in the repeater device 30 to start up. Then the section loss between two transmission devices 10 and 20 is calculated, which permits the VOA and optical amplifiers in the transmission device 10 to start up.

Fourth Embodiment

This section describes a system with automatic startup functions according to a fourth embodiment of the present invention. The fourth embodiment differs from the preceding embodiments in that two OSC signal waves are used to calculated the transmission line loss between each two nodes for use in startup processing that follows. The system of the fourth embodiment has the same structure as what we have described in FIGS. 2 to 4, FIG. 18 shows a flowchart of an automatic startup process according to the fourth embodiment of the invention.

(S91a) A service engineer inserts a preamplifier unit 21a-2 to the transmission device 20. This event triggers the controller 22 to execute startup processing. Note that OSC signals have to be available at this stage.

(S91b) The controller 22 examines whether OSC signals and main signals are available on the receiving transmission line. This test reveals poor fiber connection, if any.

(S92a) Triggered by the event at either step S91a or step S91b, the controller 22 executes the following: Upon insertion of a preamplifier unit 21a-2 at step S91a, the VOA controller 22a-3 immediately initializes the corresponding VOA 21a-1 to a predetermined attenuation level, permitting an OSC module 22a-2 to receive a sufficient amount of optical input power. The process then advances to step S93. Or, upon detection of poor fiber connection at step S91b, the VOA controller 22a-3 initializes the VOA 21a-1 in the same way as in the former case, before the process advances to step S92b.

(S92b) With the presence of OSC signals coming from a remote OSC module 32a-1, the OSC module 22a-2 finds it as a trigger to an automatic startup process. More specifically, the controller 22 is designed to detect poor fiber connection when neither main optical signals nor OSC signals are found. The controller 22 interprets in turn the presence of OSC signals as a sign of recovery from a fiber-related problem. It therefore invokes a startup process (or restart process) upon detection of OSC signals, whether main optical signals are available or not.

(S93) The OSC module 32a-1 transmits two OSC signals, one of which has a shorter wavelength than main optical signals, and the other of which has a longer wavelength than main optical signals.

(S94) The two OSC signals have different power levels at the destination transmission device 20. The receiving OSC module 22a-2 estimates section loss of main optical signals from the observation of those signals (described in detail later).

(S95) Based on the output power level (design value) of the inline amplifier unit 31a-2 and the section loss estimated at step S94, the VOA controller 22a-3 calculates an expected input power level of the preamplifier unit 21a-2. If this value is agreeable to the desired input level of the preamplifier unit 21a-2, then it calculates a required attenuation ratio of the VOA 21a-1. The above design value of output power may be stored in the OSC module 32a-2 and supplied to the VOA controller 22a-3 in the form of an OSC message.

(S96) The VOA 21a-1 is set up with the attenuation ratio calculated at step S95. The process advances to step S98 if the resulting input power level falls within a required input dynamic range of the preamplifier unit 21a-2. If not, the process branches to step S97.

(S97) The controller 22 raises an alarm.

(S98) The controller 22 keeps the loss of the VOA 21a-1 at a constant level.

(S99) The controller 22 calculates a gain value from the section loss-based estimate of preamplifier input and the required output power level. It then activates the preamplifier unit 21a-2 in AGC mode with that gain value. The controller 22 may then receive an incoming OSC message indicating transmission of main signals, and if this is the case, it sets the preamplifier unit 21a-2 to operate in ALC mode, where the output power level is determined from the number of incoming wavelengths. The post-amplifier unit 21a-3, on the other hand, operates in normal operation mode with AGC functions enabled.

Figure 19A:
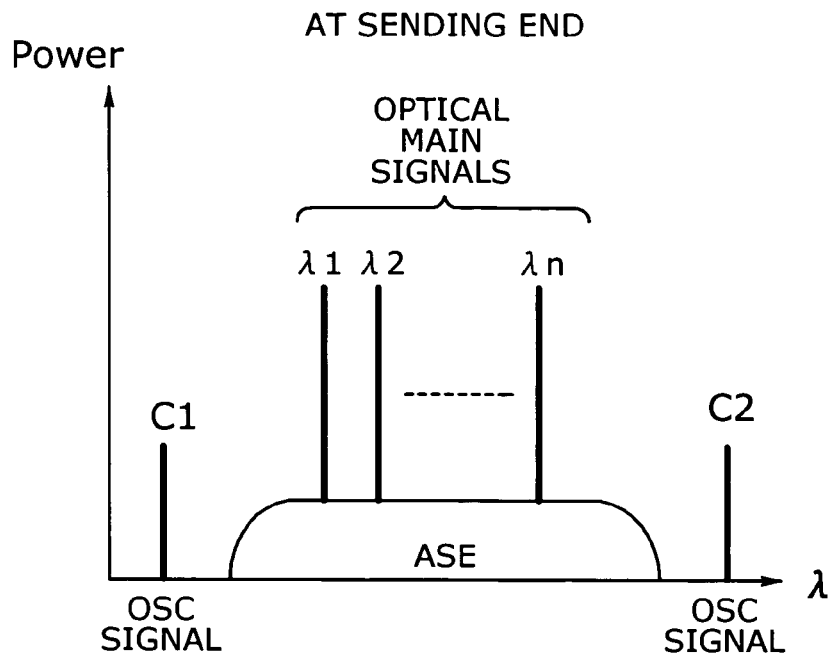
FIGS. 19A and 19B show the concept of section loss estimation using two OSC signal waves.
Figure 19B:
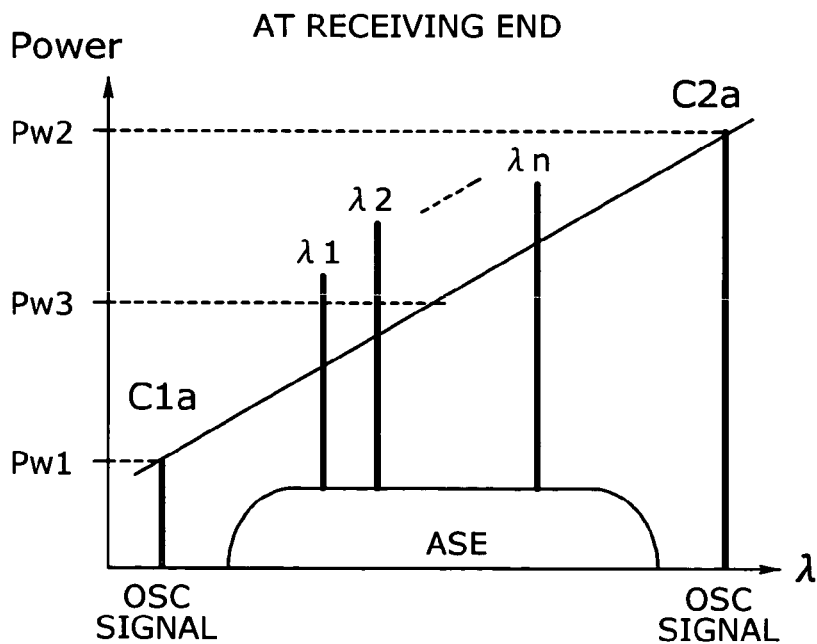
Figure 20:
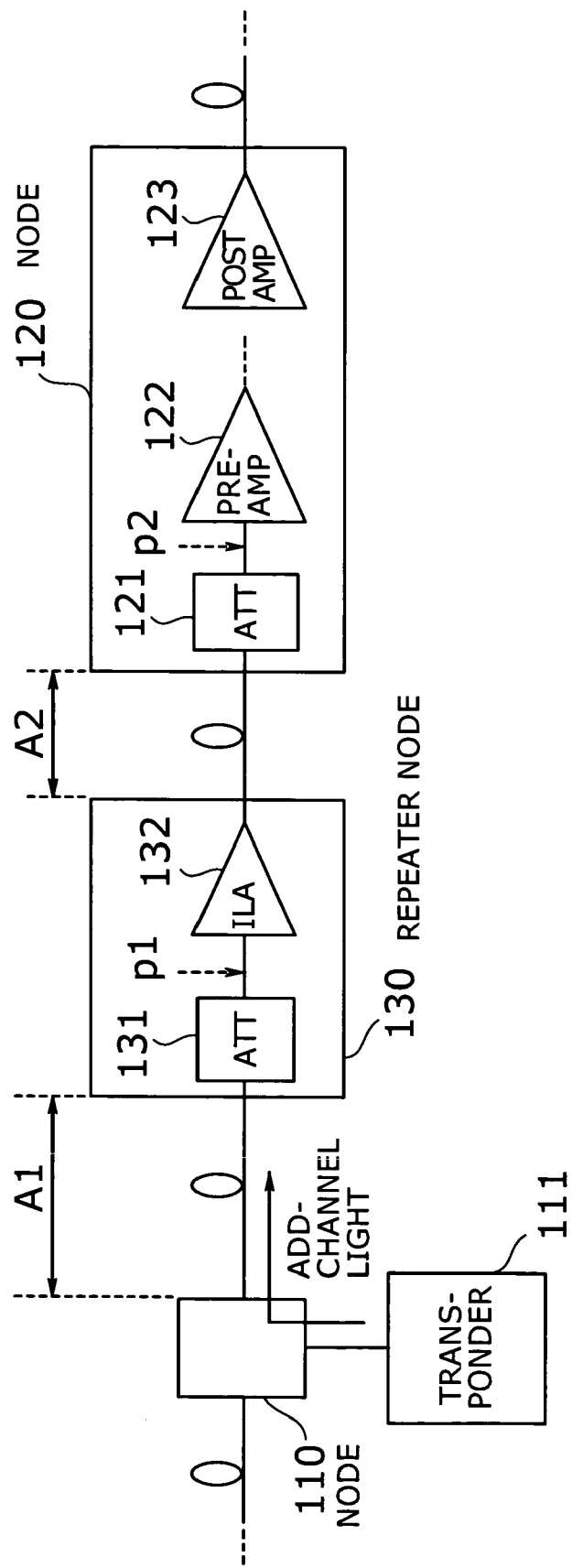
FIG. 20 shows signal level adjustment in a conventional WDM system.

FIGS. 19A and 19B show the concept of section loss estimation using two OSC signal waves. In a startup process, the OSC module 32a-1 produces two OSC signals. One signal C1 has a wavelength of, for example, 1510 nm, which is shorter than main optical signals (WDM signals). The other signal C2 is 1625 nm or the like, which is longer than main optical signals. That is, the wavelength range defined by those two signals C1 and C2 contains all main optical signals in its middle segment.

Only OSC signals C1 and C2 are transmitted in the startup process, although FIG. 19A shows main optical signals as well. C1 and C2 depart the sending end with equal power levels. However, when they reach the destination device 20, one OSC signal C1 is reduced (see C1a in FIG. 19B), whereas the other OSC signal C2 is boosted (see C2a). This unevenness comes from stimulated Raman scattering in the WDM transmission line, one of the non-linear effects of fiber-optic media. Stimulated Raman scattering causes power transfer from higher-energy, shorter-wavelengths signals to lower-energy, longer-wavelength signals. In other words, shorter-wavelength channels lose power during the travel over the transmission medium, while longer-wavelength channels gain power. The resulting unevenness in the power spectrum is called gain tilt.

Referring to FIG. 19B, the OSC module 22a-2 measures the receive levels Pw1 and Pw2 of OSC signals C1a and C1b, and then it calculates their average Pw3, namely, (Pw1+Pw2)/2. This Pw3 is considered as an estimate of the receive level of main optical signals. Let Pw0 represent the power (design value) of main optical signals at the originating device. Since Pw0 is known to the downstream device controller 22, the difference Pw0-Pw3 indicates how much main signal power is lost in the section of interest. Now that the section loss is determined, the system of the fourth embodiment starts up itself in the same way as in the third embodiment.

As described above, the fourth embodiment provides a function of estimating section loss from the difference in receive power levels between two OSC signals with different wavelengths. Recall that the third embodiment estimates section loss by using formula (1), which involves some variable parameters such as LcOSC and Lcs (transmission loss coefficients in OSC signal band and main signal band, respectively). Those parameters may vary depending on transmission line conditions. The fourth embodiment avoids the use of such parameters, thus enabling more accurate estimation for the section loss.

Other Variations

As can be seen from the preceding discussion, the present invention enables automatic setup of transmission devices including repeaters to adjust the power level of optical input signals, which is different from node to node, depending on actual power loss and other conditions of transmission lines. The proposed system and devices adjust their input and output to appropriate signal levels by exchanging messages between nodes, without consuming main information channel signals from transponders or the like.

VOAs used in the above-described embodiments have photodiodes as input and output power sensors for the purpose of feedback control. It should be appreciated that the point is to obtain a constant attenuation at each VOA when the optical transmission system is in operation. In this sense, there are other suitable types of VOAs, such as those based on magneto-optical effects and those with a micro electromechanical system (MEMS) structure, whose attenuation levels are insensitive to temperature variations. The use of such VOAs makes it possible to eliminate photodiodes and feedback loop processing.

Repeater nodes described in the preceding sections are not necessarily essential to the optical transmission systems of the present invention. As discussed in FIG. 1, the proposed automatic startup processing can even be implemented in a very simple system formed solely from two distant optical transmission devices 10 and 20, with no intermediate nodes like the repeater device 30 in the first embodiment.

CONCLUSION

To summarize the above discussion, the present invention provides an optical transmission system automatically adjusts the attenuation level of each VOA in transmission devices and repeaters and selects operating mode of each optical amplifier integrated in those devices. In this startup process, upstream and downstream device controllers interact with each other through supervisor control channels to perform their tasks in a coordinated way. The downstream device controller adjusts its local VOA by utilizing optical noise emission from a post-amplifier in an upstream device, as well as setting a preamplifier unit to operate in appropriate operating mode. The upstream device controller causes its local post-amplifier to produce optical noise for use in the attenuator adjustment. It also switches operating mode of its local post-amplifier unit accordingly. Every optical amplifier is thus brought into operational conditions, with an input power level optimized without burdening service engineers with manual tasks. Such features of the present invention will make an optical transmission system easier to operate and maintain.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for transporting optical signals over downstream and upstream optical transmission lines, comprising:

(a) a downstream optical transmission device comprising:

a first optical transmission unit that receives downstream optical signals from the downstream optical transmission line, which comprises a preamplifier unit to amplify incoming optical signals, and a downstream-device variable optical attenuator disposed before the preamplifier unit to attenuate the incoming optical signals, a second optical transmission unit oriented in the opposite direction to the first optical transmission unit to transmit upstream optical signals over the upstream optical transmission line, and a downstream device controller that adjusts the downstream-device variable optical attenuator by utilizing incoming optical noise and selects and sets operating mode of the preamplifier unit during an automatic startup process; and (b) an upstream optical transmission device comprising:

a third optical transmission unit that transmits the downstream optical signals over the downstream optical transmission line, which comprises a post-amplifier unit to amplify the optical signals for transmission, a fourth optical transmission unit oriented in the opposite direction to the third optical transmission unit to receive the upstream optical signals from the upstream optical transmission line, and an upstream device controller that causes the post-amplifier unit to emit optical noise and selects and sets operating mode of the post-amplifier unit, while exchanging messages with the downstream device controller over a supervisory control channel during the automatic startup process.

2. The optical transmission system according to claim 1, wherein in the automatic startup process, the downstream device controller performs at least one of the functions of:

initializing the downstream-device variable optical attenuator;

sending an upstream message requesting emission of optical noise;

receiving a downstream message that reports successful emission of optical noise;

measuring optical input power that the preamplifier unit is receiving;

controlling the downstream-device variable optical attenuator to maintain a constant loss, so that the measured value of the optical input power will be equal to a target level that the preamplifier requires;

determining gain of the preamplifier unit in ALC mode and switching the preamplifier unit to operate in AGC mode;

sending an upstream message requesting to stop the emission of optical noise;

receiving a downstream message indicating the completion of startup processing at the upstream optical transmission device; and setting the preamplifier unit to operate in normal operation mode.

3. The optical transmission system according to claim 2, wherein the downstream device controller initializes the downstream-device variable optical attenuator, being triggered by detection of downstream signals on the supervisory control channel or insertion of the preamplifier unit.

4. The optical transmission system according to claim 2, wherein:

the downstream-device variable optical attenuator is under feedback control to provide a constant loss;

the feedback control determines attenuation of the downstream-device variable optical attenuator from difference between input and output power levels being monitored; and the feedback control has a time constant large enough to be insensitive to expected fluctuations of the input power level.

5. The optical transmission system according to claim 2, wherein:

the downstream-device variable optical attenuator is under feedback control to provide a constant loss;

the feedback control determines attenuation of the downstream-device variable optical attenuator from difference between input and output power levels being monitored; and the downstream-device variable optical attenuator receives supervisory control channel signals after the optical noise is lost as a result of the upstream message requesting to stop the emission thereof, whereby the feedback control can continue to observe the input and output power levels.

6. The optical transmission system according to claim 1, wherein in the automatic startup process, the upstream device controller performs at least one of the functions of:
receiving an upstream message requesting emission of optical noise;
setting the post-amplifier unit to operate in noise emission mode;
sending a downstream message to report successful emission of optical noise;
receiving an upstream message requesting to stop the emission of optical noise;
setting the post-amplifier unit to operate in normal operation mode; and
sending a downstream message indicating completion of automatic startup of the upstream optical transmission device itself.

7. The optical transmission system according to claim 1, further comprising an optical repeater device disposed between the upstream and downstream optical transmission devices, the optical repeater device comprising:
(a) a first optical repeater unit on the downstream optical transmission line, comprising:
an inline amplifier unit that boosts the downstream optical signals, and
a repeater-device variable optical attenuator disposed before the inline amplifier unit to attenuate the downstream optical signals;
(b) a second optical repeater unit oriented in the opposite direction to the first optical repeater unit to boost the upstream optical signals on the upstream optical transmission line; and
(c) a repeater device controller that adjusts the repeater-device variable optical attenuator by utilizing incoming optical noise and selects and sets operating mode of the inline amplifier unit, while exchanging messages with the upstream and downstream device controllers over a supervisory control channel during the automatic startup process.

8. The optical transmission system according to claim 7, wherein in the automatic startup process, the repeater device controller performs at least one of the functions of:
receiving an upstream message that requests emission of optical noise;
initializing the repeater-device variable optical attenuator;
forwarding an upstream message requesting emission of optical noise;
receiving a downstream message that reports successful emission of optical noise;
measuring optical input power that the inline amplifier unit is receiving;
controlling the repeater-device variable optical attenuator to maintain a constant loss, so that the measured value of the optical input power will be equal to a target level that the inline amplifier requires;
setting the inline amplifier unit to operate in noise emission mode;
sending a downstream message to report successful emission of optical noise;
receiving an upstream message requesting to stop the emission of optical noise;
forwarding the upstream message requesting to stop the emission of optical noise;
receiving a downstream message indicating completion of startup processing at the upstream optical transmission device;
setting the inline amplifier unit to operate in normal operation mode; and
sending a downstream message indicating completion of automatic startup of the optical repeater device itself.

9. A downstream optical transmission device located downstream in an optical transmission system, comprising:
(a) a first optical transmission unit that receives downstream optical signals from a downstream optical transmission line, comprising:
a preamplifier unit to amplify incoming optical signals,
a post-amplifier unit to boost outputting optical signals, and
a downstream-device variable optical attenuator disposed before the preamplifier unit to attenuate the incoming optical signals;
(b) a second optical transmission unit oriented in the opposite direction to the first optical transmission unit to transmit upstream optical signals over an upstream optical transmission line; and
(c) a downstream device controller interacting with an upstream device in the optical transmission system by exchanging messages over a supervisory control channel, wherein in an automatic startup process, the downstream device controller performs one of the functions of:
initializing the downstream-device variable optical attenuator,
sending an upstream message to the upstream device to request emission of optical noise,
receiving a downstream message from the upstream device that reports successful emission of optical noise,
measuring optical input power that the preamplifier unit is receiving,
controlling the downstream-device variable optical attenuator to maintain a constant loss, so that the measured value of the optical input power will be equal to a target level that the preamplifier requires,
determining gain of the preamplifier unit in ALC mode and switching the preamplifier unit to operate in AGC mode,
sending an upstream message to request the upstream device to stop the emission of optical noise,
receiving a downstream message indicating the completion of startup processing at the upstream device, and
setting the preamplifier unit to operate in normal operation mode,
wherein the downstream device controller is coupled to:
an output part of the downstream-device variable optical attenuator included in the first optical transmission unit,
an output part of the post-amplifier unit included in the first optical transmission unit,
an output part of the downstream-device variable optical attenuator included in the second optical transmission unit, and
an output part of the post-amplifier unit included in the second optical transmission unit.

10. An upstream optical transmission device located upstream in an optical transmission system, comprising:
(a) a first optical transmission unit that transmits downstream optical signals over a downstream optical transmission line, including:
a preamplifier unit to amplify incoming optical signals;
a post-amplifier unit to boost outputting optical signals, and
a upstream-device variable optical attenuator disposed before the preamplifier unit to attenuate the incoming optical signals;

(b) a second optical transmission unit disposed in the opposite direction to the first optical transmission unit to receive upstream optical signals from an upstream optical transmission line;

(c) an upstream device controller interacting with a downstream device in the optical transmission system by exchanging messages over a supervisory control channel, wherein in an automatic startup process, the upstream device controller performs one of the functions of:

receiving an upstream message from the downstream device that requests emission of optical noise, setting the post-amplifier unit to operate in noise emission mode, sending a downstream message to the downstream device to report successful emission of optical noise, receiving an upstream message requesting to stop the emission of optical noise, setting the post-amplifier unit to operate in normal operation mode, and sending a downstream message notifying the downstream device of completion of startup processing at the upstream optical transmission device itself, wherein the upstream device controller is coupled to:

an output part of the upstream-device variable optical attenuator included in the first optical transmission unit, an output part of the post-amplifier unit included in the first optical transmission unit, an output part of the upstream-device variable optical attenuator included in the second optical transmission unit, and an output part of the post-amplifier unit included in the second optical transmission unit.

11. An intermediate optical transmission device disposed between an upstream device and a downstream device in an optical transmission system, the intermediate optical transmission device comprising:

(a) a first optical repeater unit on a downstream optical transmission line, comprising:

an inline amplifier unit that boosts downstream optical signals, and a repeater-device variable optical attenuator disposed before the inline amplifier unit to attenuate incoming downstream optical signals;

(b) a second optical repeater unit oriented in the opposite direction to the first optical repeater unit to boost upstream optical signals on an upstream optical transmission line; and (c) a repeater device controller interacting with the upstream and downstream devices by exchanging messages over a supervisory control channel, wherein in an automatic startup process, the repeater device controller performs one of the functions of:

receiving an upstream message from the downstream device that requests emission of optical noise, initializing the repeater-device variable optical attenuator, forwarding to the upstream device the upstream message requesting emission of optical noise, receiving a downstream message from the upstream device that reports successful emission of optical noise, measuring optical input power that the inline amplifier unit is receiving, controlling the repeater-device variable optical attenuator to maintain a constant loss, so that the measured value of the optical input power will be equal to a target level that the inline amplifier requires, setting the inline amplifier unit to operate in noise emission mode, sending a downstream message to the downstream device to report successful emission of optical noise, receiving an upstream message requesting to stop the emission of optical noise, forwarding to the upstream device the upstream message requesting to stop the emission of optical noise, receiving a downstream message indicating completion of startup processing at the upstream device, setting the inline amplifier unit to operate in normal operation mode, and sending a downstream message notifying the downstream device of completion of startup processing at the intermediate optical transmission device itself, wherein the repeater device controller is coupled to:

an output part of the repeater-device variable optical attenuator included in the first optical repeater unit, an output part of the inline amplifier unit included in the first optical repeater unit, an output part of the repeater-device variable optical attenuator included in the second optical repeater unit, and an output part of the inline amplifier unit included in the second optical repeater unit.

12. An optical transmission system for transporting optical signals over downstream and upstream optical transmission lines, comprising:

(a) a downstream optical transmission device comprising:

a first optical transmission unit that receives downstream optical signals from the downstream optical transmission line, which comprises a preamplifier unit to amplify the received downstream optical signals, a second optical transmission unit disposed in the opposite direction to the first optical transmission unit to transmission upstream optical signals over the upstream optical transmission line;

a downstream device controller that selects and sets operating mode of the preamplifier unit during an automatic startup process; and (b) an upstream optical transmission device comprising:

a third optical transmission unit that transmits the downstream optical signals over the downstream transmission line, which comprises a post-amplifier unit to amplify the downstream optical signals for transmission, and an upstream-device variable optical attenuator disposed after the post-amplifier unit to attenuate the downstream optical signals, a fourth optical transmission unit oriented in the opposite direction to the third optical transmission unit to receive the upstream optical signals from the upstream optical transmission line, and an upstream device controller that causes the post-amplifier unit to emit optical noise, adjusts the upstream-device variable optical attenuator by using the optical noise in such a way that output power level of the post-amplifier will not exceed an upper limit determined from non-linear effects of a fiber-optic medium used, and selects and sets operating mode of the post-amplifier unit, while exchanging messages with the downstream device controller over a supervisory control channel during the automatic startup process.

13. The optical transmission system according to claim 12, wherein in the automatic startup process, the downstream device controller performs at least one of the functions of:

sending an upstream message to request emission of optical noise;

measuring optical input power that the preamplifier unit is receiving;

sending an upstream message containing the measured value of the optical input power;

receiving a downstream message that reports successful emission of optical noise;

determining gain of the preamplifier unit in ALC mode and switching the preamplifier unit to operate in AGC mode;

sending an upstream message requesting to stop the emission of optical noise;

receiving a downstream message indicating the completion of startup processing; and setting the preamplifier unit to operate in normal operation mode.

14. The optical transmission system according to claim 13, wherein the downstream device controller sends the upstream message requesting emission of optical noise, being triggered by detection of downstream signals on the supervisory control channel or insertion of the preamplifier unit.

15. The optical transmission system according to claim 12, wherein in the automatic startup process, the upstream device controller performs at least one of the functions of:

receiving an upstream message requesting emission of optical noise;

setting the post-amplifier unit to operate in noise emission mode;

measuring optical output power that the post-amplifier unit is producing;

adjusting the upstream-device variable optical attenuator so that the measured value of the optical output power will not exceed a specified upper limit;

receiving an upstream message containing a measured value of received optical power of the downstream optical signals;

controlling the upstream-device variable optical attenuator to maintain a constant loss, so that the measured value of received optical power will be equal to a given target level;

sending a downstream message to report successful emission of optical noise;

receiving an upstream message requesting to stop the emission of optical noise;

setting the post-amplifier unit to operate in normal operation mode; and sending a downstream message reporting completion of startup processing at the optical repeater device itself.

16. The optical transmission system according to claim 15, wherein:

the upstream-device variable optical attenuator is under feedback control to provide a constant loss;

the feedback control determines attenuation of the upstream-device variable optical attenuator from difference between input and output power levels being monitored; and the feedback control has a time constant large enough to be insensitive to expected fluctuations of the input power level.

17. The optical transmission system according to claim 15, wherein:

the upstream-device variable optical attenuator is under feedback control to provide a constant loss;

the feedback control determines attenuation of the upstream-device variable optical attenuator from difference between input and output power levels being monitored; and the upstream-device variable optical attenuator receives supervisory control channel signals after the optical noise is lost as a result of the upstream message requesting to stop the emission thereof, whereby the feedback control can continue to observe the input and output power levels.

18. The optical transmission system according to claim 12, further comprising an optical repeater device disposed between the upstream and downstream optical transmission devices, the optical repeater device comprising:

(a) a first optical repeater unit on the downstream optical transmission line, comprising:

an inline amplifier unit that boosts the downstream optical signals, and a repeater-device variable optical attenuator disposed after the inline amplifier unit to attenuate the downstream optical signals;

(b) a second optical repeater unit oriented in the opposite direction to the first optical repeater unit to boost upstream optical signals on the upstream optical transmission line; and (c) a repeater device controller that adjusts the repeater-device variable optical attenuator by using the optical noise supplied from the upstream optical transmission device through the inline amplifier unit, and selects and sets operating mode of the inline amplifier unit, while exchanging messages with the upstream and downstream device controllers over the supervisory control channel during the automatic startup process.

19. The optical transmission system according to claim 18, wherein in the automatic startup process, the repeater device controller performs at least one of the functions of:

receiving an upstream message requesting emission of optical noise;

initializing the repeater-device variable optical attenuator;

forwarding to the upstream optical transmission device the upstream message requesting emission of optical noise;

measuring optical input power that the inline amplifier unit is receiving;

sending an upstream message containing the measured value of the optical input power;

receiving a downstream message reporting successful emission of optical noise;

determining gain of the inline amplifier unit in ALC mode and switching the inline amplifier unit to operate in AGC mode;

measuring optical output power that the inline amplifier unit is producing;

receiving an upstream message containing a measured value of optical power that the downstream optical transmission device is receiving;

adjusting the repeater-device variable optical attenuator so that the measured value of the optical output power will not exceed a specified upper limit;

controlling the repeater-device variable optical attenuator to maintain a constant loss, so that the measured value of the received optical power will be equal to a given target level of the preamplifier unit in the downstream optical transmission device;

forwarding an upstream message requesting to stop the emission of optical noise;

receiving a downstream message indicating completion of startup processing at the upstream optical transmission device;

setting the inline amplifier unit to operate in normal operation mode; and sending a downstream message reporting completion of startup processing at the optical repeater device itself.

20. A downstream optical transmission device located downstream in an optical transmission system, comprising:

(a) a first optical transmission unit that receives downstream optical signals from a downstream optical transmission line, including:

a preamplifier unit to amplify incoming optical signals, a post-amplifier unit to boost outputting optical signals, and a downstream-device variable optical attenuator disposed after the post-amplifier unit to attenuate the outputting optical signals;

(b) a second optical transmission unit disposed in the opposite direction to the first optical transmission unit to transmission upstream optical signals over an upstream optical transmission line;

(c) a downstream device controller interacting with an upstream device in the optical transmission system by exchanging messages over a supervisory control channel, wherein in an automatic startup process, the downstream device controller performs one of the functions of:

sending an upstream message to the upstream device to request emission of optical noise, measuring optical input power that the preamplifier unit is receiving, sending the upstream device an upstream message containing the measured value of the optical input power, receiving a downstream message from the upstream device that reports successful emission of optical noise, determining gain of the preamplifier unit in ALC mode and switching the preamplifier unit to operate in AGC mode, sending an upstream message requesting the upstream device to stop the emission of optical noise, receiving a downstream message indicating the completion of startup processing at the upstream device, and setting the preamplifier unit to operate in normal operation mode, wherein the downstream device controller is coupled to:

an input part of the preamplifier unit included in the first optical transmission unit, an input part of the downstream-device variable optical attenuator included in the first optical transmission unit, an input part of the preamplifier unit included in the second optical transmission unit, and an input part of the downstream-device variable optical attenuator included in the second optical transmission unit.

21. An upstream optical transmission device located upstream in an optical transmission system, the upstream optical transmission device comprising:

(a) a first optical transmission unit that transmits downstream optical signals over a downstream transmission line, comprising:

a preamplifier unit to amplify incoming optical signals;

a post-amplifier unit that amplifies the downstream optical signals for transmission, and an upstream-device variable optical attenuator disposed after the post-amplifier unit to attenuate the downstream optical signals;

(b) a second optical transmission unit oriented in the opposite direction to the first optical transmission unit to receive upstream optical signals from an upstream optical transmission line; and (c) an upstream device controller interacting with a downstream device in the optical transmission system by exchanging messages over a supervisory control channel, wherein in an automatic startup process, the upstream device controller performs one of the functions of:

receiving an upstream message from the downstream device that requests emission of optical noise, setting the post-amplifier unit to operate in noise emission mode, measuring optical output power that the post-amplifier unit is producing, adjusting the upstream-device variable optical attenuator so that the measured value of the optical output power will not exceed a specified upper limit, receiving an upstream message containing a measured value of optical power that the downstream device is receiving, controlling the upstream-device variable optical attenuator to maintain a constant loss, so that the measured value of the received optical power will be equal to a given target level of the downstream device, sending a downstream message to the downstream device to report successful emission of optical noise, receiving an upstream message requesting to stop the emission of optical noise, setting the post-amplifier unit to operate in normal operation mode, and sending a downstream message to the downstream device to report completion of startup processing at the upstream optical transmission device itself, wherein the upstream device controller is coupled to:

an input part of the preamplifier unit included in the first optical transmission unit, an input part of the upstream-device variable optical attenuator included in the first optical transmission unit, an input part of the preamplifier unit included in the second optical transmission unit, and an input part of the upstream-device variable optical attenuator included in the second optical transmission unit.

22. An intermediate optical transmission device disposed between an upstream device and a downstream device in an optical transmission system, the optical repeater device comprising:

(a) a first optical repeater unit on a downstream optical transmission line, comprising:

an inline amplifier unit that boosts downstream optical signals, and a repeater-device variable optical attenuator disposed after the inline amplifier unit to attenuate the downstream optical signals;

(b) a second optical repeater unit oriented in the opposite direction to the first optical repeater unit to boost upstream optical signals on the upstream optical transmission line; and (c) a repeater device controller interacting with the upstream and downstream devices by exchanging messages over a supervisory control channel, wherein in an automatic startup process, the repeater device controller performs one of the functions of:

receiving an upstream message from the downstream device that requests emission of optical noise, initializing the repeater-device variable optical attenuator, forwarding to the upstream device the upstream message requesting emission of optical noise, measuring optical input power that the inline amplifier unit is receiving, sending an upstream message containing the measured value of the optical input power, receiving a downstream message from the upstream device that reports successful emission of optical noise, setting the inline amplifier unit to operate in noise emission mode, measuring optical output power that the inline amplifier unit is producing, receiving an upstream message containing a measured value of optical power that the downstream device is receiving, adjusting the repeater-device variable optical attenuator so that the measured value of the optical output power will not exceed a specified upper limit, controlling the repeater-device variable optical attenuator to maintain a constant loss, so that the measured value of the received optical power will be equal to a given target level that the downstream device requires, forwarding an upstream message requesting to stop the emission of optical noise, receiving a downstream message indicating completion of startup processing at the upstream device, setting the inline amplifier unit to operate in normal operation mode, and sending a downstream message to report completion of startup processing at the intermediate optical transmission device itself, wherein the repeater device controller is coupled to:

an input part of the inline amplifier included in the first optical reoeater unit, an input part of the repeater-device variable optical attenuator included in the first optical repeater unit, an input part of the inline amplifier included in the second optical repeater unit, and an input part of the repeater-device variable optical attenuator included in the second optical repeater unit.

* * * * *

UNITED STATES PATENT AND TRADEMARK OFFICE
CERTIFICATE OF CORRECTION

PATENT NO. : 7,343,102 B2 Page 1 of 1
APPLICATION NO. : 10/898541
DATED : March 11, 2008
INVENTOR(S) : Hiroaki Tomofuji et al.

It is certified that error appears in the above-identified patent and that said Letters Patent is hereby corrected as shown below:

Column 34, line 12, change "optical reoeater unit," to --optical repeater unit,--.

Signed and Sealed this

Eighth Day of July, 2008

JON W. DUDAS
*Director of the United States Patent and Trademark Office*